US009038108B2

(12) United States Patent
McCausland et al.

(10) Patent No.: US 9,038,108 B2
(45) Date of Patent: May 19, 2015

(54) METHOD AND SYSTEM FOR PROVIDING END USER COMMUNITY FUNCTIONALITY FOR PUBLICATION AND DELIVERY OF DIGITAL MEDIA CONTENT

(75) Inventors: Douglas McCausland, Arlington, VA (US); David Horner, Ashburn, VA (US); Jonathan L. Discount, Arlington, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 2703 days.

(21) Appl. No.: 11/479,715

(22) Filed: Jun. 30, 2006

(65) Prior Publication Data

US 2006/0253542 A1  Nov. 9, 2006

Related U.S. Application Data

(63) Continuation-in-part of application No. 10/311,903, filed as application No. PCT/GB01/02857 on Jun. 27, 2001, now Pat. No. 7,096,226.

(60) Provisional application No. 60/714,674, filed on Sep. 7, 2005.

(30) Foreign Application Priority Data

Jun. 28, 2000  (GB) .................................. 0015896.4
Mar. 7, 2005  (GB) .................................. 0504675.0

(51) Int. Cl.
*G06F 3/00* (2006.01)
*G06F 13/00* (2006.01)

(Continued)

(52) U.S. Cl.
CPC .............. *H04L 67/06* (2013.01); *H04L 12/581* (2013.01); *H04L 51/04* (2013.01); *H04L 67/28* (2013.01); *H04L 67/2838* (2013.01)

(58) Field of Classification Search
USPC ........... 725/37–61, 109, 80, 81, 82, 133, 141, 725/153; 709/207
See application file for complete search history.

(56) References Cited

U.S. PATENT DOCUMENTS 5,303,367 A   4/1994  Leenstra et al.
5,313,630 A   5/1994  Namioka et al.
(Continued)

FOREIGN PATENT DOCUMENTS

EP      0764951     3/1997
EP      1463058     9/2004
(Continued)

OTHER PUBLICATIONS

"Advanced Systems Format (ASF) Specification," Microsoft Corporation, Revision Jan. 20, 2002, http://download.microsoft.com/download/E/0/6/E06DB390-1E2A-4978-82BB-311810D8A28D/ASF_Specification.doc, 104 pages, Jun. 2004.

(Continued)

*Primary Examiner* — Pankaj Kumar
*Assistant Examiner* — Alazar Tilahun

(57) ABSTRACT

An approach provides management of digital assets. A digital asset is transmitted to one of a plurality of devices configured to support instant communications. The digital asset can be shared among the devices within the instant communications environment. A portal is provided for users of the devices to manage respective instant communications accounts.

17 Claims, 15 Drawing Sheets

(51) Int. Cl.

| | |
|---|---|
| H04N 5/455 | (2006.01) |
| H04N 7/18 | (2006.01) |
| H04N 7/16 | (2011.01) |
| H04L 29/08 | (2006.01) |
| H04L 12/58 | (2006.01) |

(56) References Cited

U.S. PATENT DOCUMENTS

| | | | |
|---|---|---|---|
| 5,499,371 | A | 3/1996 | Henninger et al. |
| 5,557,790 | A | 9/1996 | Bingham et al. |
| 5,611,076 | A | 3/1997 | Durflinger et al. |
| 5,612,715 | A | 3/1997 | Karaki et al. |
| 5,729,730 | A | 3/1998 | Wlaschin et al. |
| 5,790,176 | A | 8/1998 | Craig |
| 5,799,310 | A | 8/1998 | Anderson et al. |
| 5,831,669 | A | 11/1998 | Adrain |
| 5,845,073 | A | 12/1998 | Carlin et al. |
| 5,852,435 | A | 12/1998 | Vigneaux et al. |
| 5,864,870 | A | 1/1999 | Guck |
| 5,892,900 | A | 4/1999 | Ginter et al. |
| 5,930,446 | A | 7/1999 | Kanda |
| 5,956,424 | A | 9/1999 | Wootton et al. |
| 5,980,044 | A | 11/1999 | Cannon et al. |
| 6,026,408 | A | 2/2000 | Srinivasan et al. |
| 6,047,291 | A | 4/2000 | Anderson et al. |
| 6,069,627 | A | 5/2000 | Conrad et al. |
| 6,092,154 | A | 7/2000 | Curtis et al. |
| 6,151,622 | A | 11/2000 | Fraekel et al. |
| 6,211,869 | B1 | 4/2001 | Loveman et al. |
| 6,222,549 | B1 | 4/2001 | Hoddie |
| 6,226,038 | B1 | 5/2001 | Frink et al. |
| 6,226,618 | B1 | 5/2001 | Downs et al. |
| 6,246,803 | B1 | 6/2001 | Gauch |
| 6,263,313 | B1 | 7/2001 | Milsted et al. |
| 6,330,572 | B1 | 12/2001 | Sitka |
| 6,404,446 | B1 | 6/2002 | Bates et al. |
| 6,405,198 | B1 | 6/2002 | Bitar et al. |
| 6,411,770 | B1 | 6/2002 | Ito et al. |
| 6,519,571 | B1 | 2/2003 | Guheen et al. |
| 6,522,418 | B2 | 2/2003 | Yokomizo et al. |
| 6,573,907 | B1 | 6/2003 | Madrane |
| 6,643,659 | B1 | 11/2003 | MacIssac et al. |
| 6,658,568 | B1 | 12/2003 | Ginter et al. |
| 6,678,002 | B2 | 1/2004 | Frink et al. |
| 6,698,020 | B1* | 2/2004 | Zigmond et al. ............... 725/34 |
| 6,714,594 | B2 | 3/2004 | Dimitrova et al. |
| 6,721,490 | B1 | 4/2004 | Yao et al. |
| 6,728,727 | B2 | 4/2004 | Komine et al. |
| 6,732,183 | B1* | 5/2004 | Graham .................. 709/231 |
| 6,795,506 | B1 | 9/2004 | Zhang et al. |
| 6,865,540 | B1 | 3/2005 | Faber et al. |
| 6,870,887 | B2 | 3/2005 | Kauffman et al. |
| 6,917,979 | B1 | 7/2005 | Dutra et al. |
| 6,934,339 | B2 | 8/2005 | Kato |
| 6,947,959 | B1 | 9/2005 | Gill |
| 6,961,445 | B1 | 11/2005 | Jensen et al. |
| 6,970,510 | B1 | 11/2005 | Wee et al. |
| 7,168,086 | B1 | 1/2007 | Carpenter et al. |
| 7,177,520 | B2 | 2/2007 | Zetts |
| 7,310,111 | B2 | 12/2007 | Ramirez-Diaz et al. |
| 7,409,144 | B2 | 8/2008 | McGrath et al. |
| 7,505,604 | B2 | 3/2009 | Zakrzewski et al. |
| 7,522,163 | B2 | 4/2009 | Holmes |
| 7,577,959 | B2 | 8/2009 | Nguyen et al. |
| 7,629,995 | B2 | 12/2009 | Salivar et al. |
| 7,650,625 | B2 | 1/2010 | Watkins |
| 7,676,820 | B2 | 3/2010 | Snijder et al. |
| 7,782,365 | B2 | 8/2010 | Levien et al. |
| 7,783,154 | B2 | 8/2010 | Wilkins et al. |
| 7,902,978 | B2 | 3/2011 | Pederson |
| 7,952,609 | B2 | 5/2011 | Simerly et al. |
| 8,135,852 | B2 | 3/2012 | Nilsson et al. |
| 2001/0034250 | A1 | 10/2001 | Chadha |
| 2001/0051927 | A1 | 12/2001 | London et al. |
| 2002/0035732 | A1 | 3/2002 | Zetts |
| 2002/0046292 | A1 | 4/2002 | Tennison et al. |
| 2002/0052771 | A1 | 5/2002 | Bacon et al. |
| 2002/0056123 | A1 | 5/2002 | Liwerant et al. |
| 2002/0069218 | A1 | 6/2002 | Sull et al. |
| 2002/0108115 | A1 | 8/2002 | Palmer |
| 2002/0122659 | A1 | 9/2002 | McGrath et al. |
| 2002/0145622 | A1 | 10/2002 | Kauffman et al. |
| 2002/0194253 | A1 | 12/2002 | Cooper et al. |
| 2003/0001885 | A1 | 1/2003 | Lin et al. |
| 2003/0005034 | A1 | 1/2003 | Amin |
| 2003/0018978 | A1 | 1/2003 | Singal et al. |
| 2003/0025599 | A1 | 2/2003 | Monroe |
| 2003/0044162 | A1 | 3/2003 | Angel |
| 2003/0084451 | A1 | 5/2003 | Pierzga et al. |
| 2003/0088877 | A1 | 5/2003 | Loveman et al. |
| 2003/0135464 | A1 | 7/2003 | Mourad et al. |
| 2003/0188019 | A1 | 10/2003 | Wesley |
| 2003/0229900 | A1 | 12/2003 | Reisman |
| 2004/0017471 | A1 | 1/2004 | Suga et al. |
| 2004/0059996 | A1 | 3/2004 | Fasciano |
| 2004/0098754 | A1 | 5/2004 | Vella et al. |
| 2004/0131330 | A1 | 7/2004 | Wilkins et al. |
| 2004/0133467 | A1 | 7/2004 | Siler |
| 2004/0136590 | A1 | 7/2004 | Brouwer |
| 2004/0153504 | A1 | 8/2004 | Hutchinson et al. |
| 2004/0168184 | A1 | 8/2004 | Steenkamp et al. |
| 2004/0210823 | A1 | 10/2004 | Miura et al. |
| 2004/0216173 | A1 | 10/2004 | Horoszowski et al. |
| 2004/0223606 | A1 | 11/2004 | Enete et al. |
| 2004/0247284 | A1 | 12/2004 | Yamasaki |
| 2004/0255329 | A1 | 12/2004 | Compton et al. |
| 2004/0268222 | A1 | 12/2004 | Kawa et al. |
| 2004/0268224 | A1 | 12/2004 | Balkus et al. |
| 2005/0005000 | A1 | 1/2005 | Yoshimoto |
| 2005/0019005 | A1 | 1/2005 | Kim et al. |
| 2005/0049886 | A1 | 3/2005 | Grannan et al. |
| 2005/0073585 | A1 | 4/2005 | Ettinger et al. |
| 2005/0074100 | A1 | 4/2005 | Lederman |
| 2005/0091311 | A1 | 4/2005 | Lund et al. |
| 2005/0149940 | A1 | 7/2005 | Calinescu et al. |
| 2005/0185634 | A1 | 8/2005 | Benco et al. |
| 2005/0195823 | A1 | 9/2005 | Chen et al. |
| 2005/0198125 | A1 | 9/2005 | Macleod Beck et al. |
| 2005/0210520 | A1 | 9/2005 | Horvitz et al. |
| 2005/0262535 | A1 | 11/2005 | Uchida et al. |
| 2005/0262542 | A1* | 11/2005 | DeWeese et al. ............. 725/106 |
| 2005/0278425 | A1 | 12/2005 | Wilsher et al. |
| 2006/0047749 | A1 | 3/2006 | Davis et al. |
| 2006/0056732 | A1 | 3/2006 | Holmes |
| 2006/0143686 | A1 | 6/2006 | Maes |
| 2006/0146184 | A1 | 7/2006 | Gillard et al. |
| 2006/0156219 | A1 | 7/2006 | Haot et al. |
| 2006/0161635 | A1 | 7/2006 | Lamkin et al. |
| 2006/0205362 | A1 | 9/2006 | Chang et al. |
| 2006/0236221 | A1 | 10/2006 | McCausland et al. |
| 2006/0259589 | A1 | 11/2006 | Lerman et al. |
| 2006/0263039 | A1 | 11/2006 | Chiang |
| 2006/0274828 | A1 | 12/2006 | Siemens et al. |
| 2007/0006177 | A1 | 1/2007 | Aiber et al. |
| 2007/0022404 | A1 | 1/2007 | Zhang et al. |
| 2007/0043860 | A1 | 2/2007 | Pabari |
| 2007/0043875 | A1 | 2/2007 | Brannon |
| 2007/0113184 | A1 | 5/2007 | Haot et al. |
| 2008/0043106 | A1 | 2/2008 | Hassapis |
| 2008/0320599 | A1 | 12/2008 | Raley et al. |

FOREIGN PATENT DOCUMENTS

| | | |
|---|---|---|
| EP | 1864229 | 12/2007 |
| JP | 2000-341635 | 12/2000 |
| JP | 2001-346164 | 12/2001 |
| JP | 2004-088384 | 3/2004 |
| JP | 2004-320667 | 11/2004 |
| WO | 97/15018 | 4/1997 |
| WO | 97/39411 | 10/1997 |
| WO | 00/29980 | 5/2000 |

(56) References Cited

FOREIGN PATENT DOCUMENTS

| WO | 02/01384 | 1/2002 |
|---|---|---|
| WO | 2005/027068 | 3/2005 |

OTHER PUBLICATIONS

"Avipreview Frequently Asked Questions", pp. 1-7, Retrieved from the internet: URL:http://www.avipreview.com/faq.htm [retrieved Jan. 21, 2009], Oct. 15, 2002.

Bolle, et al., "Video Libraries: From Ingest to Distribution," IBM T. J. Watson Research Center, Lecture Notes in Computer Science vol. 1614, pp. 15-18, DOI:10.1007/3-540-48762-X_2, Dec. 1999.

David, "News Technology: The Cutting Edge," Appears in Capturing the Action: Changes in Newsgathering Technology, IEEE Colloquium, pp. 4/1-4/8, Oct. 27, 1995.

Gordon-Till, "My Opinion Is, Opinions Are Useful," Information World Review, Issue 184, four pages, Oct. 2002.

* cited by examiner

METHOD AND SYSTEM FOR PROVIDING END USER COMMUNITY FUNCTIONALITY FOR PUBLICATION AND DELIVERY OF DIGITAL MEDIA CONTENT

RELATED APPLICATIONS

This application is related to, and claims the benefit of the earlier filing date under 35 U.S.C. §119(e) of U.S. Provisional Patent Application Ser. No. 60/714,674, filed Sep. 7, 2005, entitled "Method and System for Supporting Media Services," and is a continuation-in-part of U.S. patent application Ser. No. 10/311,903, filed Feb. 13, 2003, entitled "Database System, Particularly for Multimedia Objects," which is a national stage application of PCT/GB01/02857 filed Jun. 27, 2001; and is related to, and claims the benefit of the earlier filing date under 35 U.S.C. §119(b) of foreign application Serial No. 0504675.0, filed Mar. 7, 2005, entitled "Video Editing Systems"; the entireties of which are incorporated herein by reference.

BACKGROUND OF THE INVENTION

The media or broadcast industry has traditionally been confined to technologies that are expensive and an inflexible with respect to editing, production and delivery of media (e.g., video). By contrast, the communications affords great flexibility in terms of providing users with alternative networks and rich communication and entertainment services. In addition, the cost of equipment, from networking elements to end user equipment, follows a downward trend as advancements are made; for example, cellular phones are ubiquitous because of their affordability. The capabilities of these devices continue to evolve at a rapid pace; e.g., cellular phones are now equipped with high resolution displays and advanced processors to support sophisticated applications and services. Further, broadband data communications services have enabled transmission of bandwidth intensive applications, such as video broadcasts (e.g., web casts). The transformation of the communications industry has in turn influenced the media industry to rethink their business models and technological approaches.

However, in adopting these advances in communication technologies, the media industry faces a number of challenges. For instance, the issue of convergence of a broadband rich media experience and live television production and delivery needs to be addressed. Also, the demands of supporting real-time news, video on demand, user personalization, and continuing creative additions to initial systems pose additional engineering challenges. Further, delivery of interactive media (which describe real events in the real world in real-time) requires the capability to quickly acquire, store, edit, and composite live and other descriptive media by numerous users, e.g., editors, artists, and producers.

Based on the foregoing, there is a clear need for approaches that enable rapid processing and delivery of digital media.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

An apparatus, method, and software for managing digital assets over a data network are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various embodiments of the present invention are described with respect to the Motion Picture Expert Group (MPEG) standards and Group of Pictures (GOP) technologies, it is contemplated that these embodiments have applicability to other equivalent video encoding standards and technologies.

Figure 1:
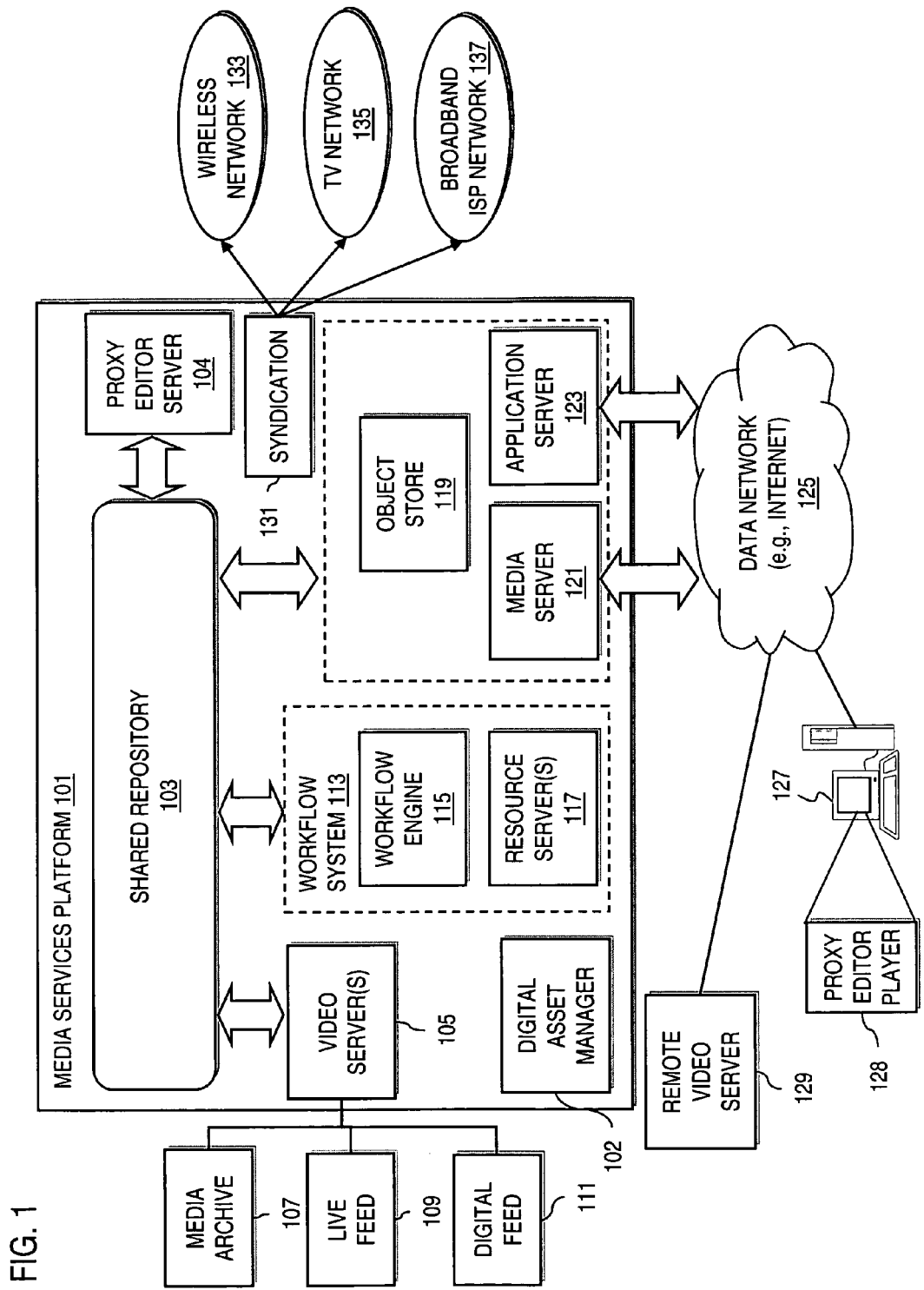
FIG. 1 is a diagram of a media services platform for supporting distributed editing and storage of digital media, according to one embodiment of the present invention.

FIG. 1 is a diagram of a media services platform for supporting distributed editing and storage of digital media, according to one embodiment of the present invention. The media services platform 101 provides an integrated media asset management platform with a fully modular architecture that enables users (e.g., customers, subscribers, etc.) to deploy the platform on a module-by-module basis as well as workflow-by-workflow. The platform 101 includes a digital asset manager (DAM) 102 that provides various media asset management functions, including archiving, mastering of long-form content for video-on-demand (VOD) distribution, digital content aggregation and distribution. The asset manager 102 supports, according to one embodiment of the present invention, a music video service that provides a portal (e.g., web portal) for collaboration among users, and a capability to target numerous media consumption platforms.

The platform 101 also supports remote proxy editing using a proxy editing application as executed by a proxy editor server 104, thereby permitting fast-turnaround broadcast productions. The editing application utilizes low-resolution version of the video content for the purposes of editing; hence, the editing application is referred to as a "proxy editor." To support the above features and functions, the media services platform 101 enables multi-channel distribution of digital content to any variety and number of devices and networks—e.g., wireless mobile devices, broadband, Internet Protocol Television (IPTV), and traditional TV platforms—thereby, reducing costs and increasing revenue over conventional systems. The architecture of the media services platform 101, according to one embodiment of the present invention, supports compact to enterprise-scale deployments, and ensures that storage and processing capabilities are robust and scalable, suitable for mission-critical broadcast operations.

It is recognized that there is an increasing need for professional, cost-effective editing of video feeds, such as television coverage of news or entertainment events, wherein the edited files can be provided over different alternative networks. For example, a user of a video enabled mobile cellular telephone might subscribe to a service that provides highlights of selected sporting events. Similarly, a user might subscribe to a sports headlines service, and receive files on a computer connected to a public data network, such as the global Internet. The real time delivery of events such as sports footage, interviews and edited highlights presents problems in such contexts, where it is necessary to produce compressed files to reduce the bandwidth for transmission over a cellular telephone network or a data network. Video files for such purposes need to be produced in an encoded format using, for instance, Group of Picture (GOP) technology, otherwise the raw digital stream would render timely transmissions and file storage impractical.

Thus, a video stream is created to include a sequence of sets of frames (i.e., GOP). By way of example, each group, typically 8 to 24 frames long, has only one complete frame represented in full. This complete frame is compressed using only intraframe compression, and thus is denoted as an I frame. Other frames are utilized and include temporally-compressed frames, representing only change data with respect to the complete frame. Specifically, during encoding, motion prediction techniques compare neighboring frames and pinpoint areas of movement, defining vectors for how each will move from one frame to the next. By recording only these vectors, the data which needs to be recorded can be substantially reduced. Predictive (P) frames refer to the previous frame, while Bi-directional (B) frames rely on previous and subsequent frames. This combination of compression techniques is highly effective in reducing the size of the video stream.

With GOP systems, an index is required to decode a given frame. Conventionally, the index is only written at the end of the file once the file has completed the encoding process. As a result, no index is available until the recording is completed. The implication is that the production of an edited version of the file, for example to transmit as highlights over a cellular phone network, cannot commence until the recording is completed and this index file produced. The media services platform 101 addresses this drawback by creating a separate index file, which can be supplemental to the routinely generated index file, during the recording and encoding process; this mechanism is detailed with respect to FIG. 5.

Accordingly, the platform 101, in an exemplary embodiment, can provide remote editing over any data network (e.g., Internet Protocol (IP)-based) that can support connectivity to the proxy editor server 104, whereby editing can commence without having to wait for completion of the recording. The proxy editor application resident on the server 104 enables developers to build professional-level desktop video editing applications using, for example, the Microsoft Windows Media 9 Series platform.

The platform 101 also provides significant scalability due to decoupled storage. Conventional editing systems required direct disk access to the video file. This poses a severe scalability issue, as every editing function (e.g., play, scrub, etc.) from the editing client creates disk traffic. If the storage cannot timely respond, a conventional editing application often freezes or crashes, such a scenario is unacceptable for real time feeds. With the media services platform 101, the content is downloaded once on each client cache; thus, the centralized storage requirements are reduced by a very significant factor (depending on editing type).

As seen in FIG. 1, the media services platform 101 utilizes a shared repository 103 that stores media (e.g., digitized video) content ingested from one or more video servers 105. Ingesting involves obtaining content into the media services platform 101, and can be accomplished locally or from a remote location. In one embodiment of the present invention, the repository 103 is deployed as a shared Storage Area Network (SAN) or NAS (Network Area Storage), which has the capability for high-performance video ingest and playback. The shared SAN 103 can utilize scalable Fibre Channel switch fabric to interface with a Fibre Channel disk array and nearline tape libraries. The video servers 105, as will be more fully described in FIG. 3, can interface any type of content sources, such as a media archive 107, a live feed 109, or a digital feed 111.

The media services platform 101 includes a workflow system 113, which comprises a workflow engine 115 and one or more resource servers 117 to support editing and distribution of digital media. The automated workflow provides the ability to automate and orchestrate repetitive workflows. In particular, the workflow system 113 offers users an overview of their work and associated events; that is, the system 113 supports an application that shows the status and progress of each job and links to relevant applications that enable the users to perform their tasks and advance the project towards completion. The workflow engine 115 controls workflow jobs and dispatches them to the resource servers 117. Communication among the resource servers 117 is facilitated by, for example, Microsoft Message Queuing.

In addition to providing individual users a central point for managing their work, the workflow system 113 is also useful as a monitoring system. For example, the system 113 can support a graphical user interface (GUI) on the user side, such that users can quickly determine through visual indicators whether tasks have been completed or error conditions exist. The users (e.g., administrators) can "drill down" to view more detail. Also, jobs can be paused, restarted (from any stage), aborted and deleted from the workflow application. This capability provides users with full control over the priority of the jobs. Additionally, the system 113 can record timing information for every step of a task, thereby enabling generation of reports on delivery turnaround etc.—e.g., for Service Level Agreement (SLA) reporting.

According to one embodiment of the present invention, the media services platform 101 can be implemented with a preconfigured, standard set of common workflows. For instance, these workflows can support generic delivery of files, rendering of edits and delivery of content from the video server 105. Moreover, customizable workflows are supported, wherein the users can integrate new services.

As shown, the media services platform 101 comprises core servers, such as an object store 119, a media server 121, and an application server 123. In an exemplary embodiment, the object store 119 contains configuration information for the workflow system 113. Configuration information include, in an exemplary embodiment, parameters of every service, the capabilities of every resource server 117, the definition of workflows, and the real time status of every job. The object store 119 supports the various applications that interface with it through an object store Application Program Interface (API). According to one embodiment of the present invention, the object store 119 has an object-based database schema (e.g., Microsoft SQL (Structured Query Language) Server, for example. The media server 121 receives stream broadcasts and serves the stream on to individual user workstations using, for example, Microsoft Windows Media. The stream contains, for example, Society of Motion Picture and Television Engineers (SMPTE) timecode, enabling the stream to be used as a frame-accurate source for live logging.

The application server 123 provides dynamic web site creation and administration functions, such as a search engine, and database capabilities. In an exemplary embodiment, the application server 123 executes Microsoft Internet Information Server (IIS), and can be configured for high availability and load-balancing based on industry standard components.

The media server 121 and the application server 123 interface with the data network 125, which can be a corporate network or the Internet. The application server 123 is thus accessible by a workstation 127, which can be any type of computing device—e.g., laptop, web appliance, palm computer, personal digital assistant (PDA), etc. The workstation 127 can utilize a browser (e.g., web-based), generally, to communicate with the media services platform 101, and a downloadable applet (e.g., ActiveX controls) to support distributed video editing functionality. The browser in conjunction with the applet is referred to an editing (or editor) interface—e.g., the proxy editor player 128. The workstation 127 can also be equipped with voiceover microphone and headphones to facilitate the editing process. The proxy editor player 128 communicates with the proxy editor server 104 to enable the viewing and editing of content, including live video, remotely. Editing functionalities include immediate access to frame-accurate content, even while being recorded, full audio and video scrubbing of source clips and edit timelines over the network 125, and generation of Advanced Authoring Format/Edit Decision List (AAF/EDL) files for craft edit integration.

To connect to the media services platform 101, the workstation 127 need not require special hardware or software. As mentioned, the workstation 127 need only be configured to run a browser application, e.g., Internet Explorer, for communication over the data network 125. With this user interface, changes or upgrades to the workstation 127 are not required, as all the applications are hosted centrally at the platform 101.

In addition to the video server 105 within the media services platform 101, a remote video server 129 can be deployed to ingest content for uploading to the platform 101 via the data network 125. The video servers 105, 129 include, in an exemplary embodiment, a longitudinal timecode (LTC) reader card as well as other video interfaces (e.g., RS-422 control card, Windows Media 9 Encoder and Matrox DigiServer video card). Video editing relies on the use of timecodes to ensure precise edits, capturing all in "in points" and "out points" of the edits. An edited video can be characterized by an edit decision list (EDL), which enumerates all the edits used to produce the edited video. LTC timecodes are recorded as a longitudinal track, analogous to audio tracks. With LTC, each frame time is divided into 80 bit cells. LTC timecodes are transmitted serially in four-bit nibbles, using Manchester codes.

The video servers 105, 129 can be remotely controlled by the workstation 127. Also, these servers 105, 129 can connect to the shared SAN 103 via Fibre Channel and a file system by, e.g., ADIC™.

A syndication (or distribution) function 131 can then distribute content over various channels, such as a wireless network 133 (e.g., cellular, wireless local area network (WLAN)), a television network 135, and a broadband Internet Service Provider (ISP) network 137. Depending on the capabilities supported by the wireless or wired access network (e.g., networks 133 and 137), rich services, such as presence, events, chatting/instant messaging (IM), voice telephony, video, games and entertainment services can be supported.

Although the video server 105, the workflow engine 115, the object store 119, the media server 121, and the application server 123 are shown as separate components, it is recognized that the functions of these servers can be combined in a variety of ways within one or more physical component. For example, the object store 119, the application server 123, and the workflow engine 115 can reside within a single server; and the video server 105 and the media server 121 can be combined into a common server.

As mentioned above, the media services platform 101 enables media asset management, rapid production, and robust, cost-effective proxy editing capabilities. By way of illustration, management of media assets to support broadband video on demand (VOD) is described. One of the first tasks involved with VOD applications is ingesting full length movies into the video servers 105 for mastering and editing (e.g., removing black, stitching tapes together, adding legal notices etc). The masters are then stored on the shared SAN 103. The content is then transcoded to a high quality media stream format, such as Microsoft Windows Media 9 Series, and delivered automatically with metadata to their broadband video pay-per-view portal (e.g., any one or more of the networks 133, 135 and 137).

Additionally, the media services platform 101 can offer video archiving services. For instance, customers can extend their online storage with nearline tape and manage content seamlessly across multiple storage devices using add-on archive modules. Online storage can be backed up and/or migrated to tape according to automated policies. Advantageously, this archival approach can be transparent to the users; that is, the users are never aware that the master video is no longer stored on expensive disk-based storage. In one embodiment, a library application can be implemented with the media services platform 103 to provide seamless integration with offline video and data tape archives. Further, the media services platform 101 provides high integration with existing production workflows through its capability to transcode and deliver any content contained in the archive to, for example, popular non-linear editors (e.g., AVID™ editor).

Furthermore, the media services platform 101 enables flexible, cost-effective content aggregation and distribution, which is suitable for content service providers. Typical workflows involve aggregation of content from owners in such formats as Motion Pictures Expert Group (MPEG)-2 or Windows Media 9, along with metadata in extensible Markup Language (XML) files, using pre-configured File Transfer Protocol (FTP) hot folders. "Hot folders" are predefined folders that trigger a workflow event (e.g., file conversion, compression, file transfer, etc.) upon movement of files into the folder. These owners can submit content directly to the workflow system 113 for automatic transcoding, Digital Rights Management (DRM) protection and syndication to multi-channel operators.

According to one embodiment of the present invention, the media services platform 101 utilizes a unified user interface (e.g., web browser) for accessing applications supported by the platform 101. It is recognized that typical production and content delivery workflows often involve the use of multiple separate applications: one application for logging, a second application for encoding, a third one for editing, a fourth application for asset management, and so on. Consequently, the challenge of effectively managing workflows is difficult. The task is even more daunting in a multi-channel production and distribution environment, as greater elements need to coordinated and more applications have to be learned over traditional television environments.

The media services platform 101 advantageously simplifies this task by permitting access to the multitude of applications via a single unified user interface as part of a coherent workflow. In this manner, although various technologies are involved, the user experience is that of a single, user-friendly suite of tools, which shield non-technical users from the complex integration of applications and technologies.

The applications supported by the platform 101 include the following: media asset management and search, video editing, video server services, workflow, syndication, upload of media, library service, administration, quality assurance, copyright protection, music cue sheet services, and reporting. In addition, the users can develop their own applications within the unified user interface. Asset management permits users to manage the location of content within organized folder structures and categories. This capability is more fully described with respect to FIG. 3. The asset search function offers a generic search capability across the entire object store 119.

The media services platform 101 also provides a flexible and cost-effective approach for proxy logging and editing of live and archive material. Such editing services can be in support of news and sport editing, archive browsing and editing, mobile, broadband and IPTV production and mastering, and promotion production. The editing application provides viewing and logging of live feeds, frame-accurate proxy logging and editing, and remote proxy editing (e.g., utilizing Windows Media 9 Series proxy format). In addition, the editing application can support instant logging and editing while the feed is recording, as well as audio and video scrubbing. This editing application includes the following capabilities: edit timeline with effects; voiceover (while editing remotely—which is ideal for translation workflows); save edit projects with versions; generate thumbnail and metadata from within the editing user interface; and export EDL's or render finished edits ready for transcoding and delivery. With this application, a user, through an inexpensive workstation 127, can efficiently master a movie for VOD distribution, rough-cut a documentary, or create a fully-finished sports highlight video with voiceover and effects.

The media services platform 101, in an exemplary embodiment, utilizes a Windows Media 9 Series codec, which allows high quality video (e.g., DVD-quality) to be logged and edited across the data network 125. Further, the platform 101 employs intelligent caching to ensure that the applications are as responsive as editing on a local hard drive, even over low-bandwidth connections; the caching architecture is described below with respect to FIG. 6.

The syndication application automates the creation and delivery of content and metadata to very specific standards for a range of target systems without manual intervention.

The upload application allows users to ingest digital files into the media services platform 101 and submit them to any permitted workflow. The users (with administrative responsibilities) can control which file types are allowed, which workflows are compatible, and the way in which different types of content are processed. The upload application can facilitate submission of the files to automatic workflows for hands-off end-to-end processing as well as to manual workflows that require manual intervention.

The upload application is complemented by a hot folder system, wherein workflow activities are automatically initiated upon movement of files into and out of the hot folders. The file system folders can be pre-configured to behave like the upload application and pass files of particular types to the workflows. Metadata for each asset provided in accompanying XML files can be acquired and mapped directly into the object store 119.

The reporting application enables users to create "printer-friendly" reports on any information stored in the object store 119. The reporting application is pre-configured with a number of default reports for reporting on content delivery. Users can filter each report by selecting a desired property of the data, e.g., subscription name, or start and end date. Through the API of the media services platform 101, users (and system integrators) can create new report templates and queries.

The library application offers the ability to manage physical media that contain instances of assets managed in the media services platform 101. Even with continuing expansion in the use of digital media, traditional media continue to play an important role. Typical production environments possess a number of video tapes, DVDs or other physical media for storing content and data. Some environments utilize large established archives.

In mixed media environments, it is beneficial to manage digital and physical instances of content in an integrated manner. Accordingly, the library application provides the following capabilities. For example, the application permits the user to generate and print barcodes for the physical media and shelves, with automatic naming as well as bulk naming (with configurable naming conventions). Also, barcodes are employed for common actions, thereby allowing completely keyboard-free operation for checking in/out and shelving of the physical media. The library application additionally can manage items across multiple physical locations, e.g., local and master libraries. Further, the application supports PDA-based applications with a barcode scanner for mobile checking in/out and shelving. The library application advantageously simplifies management of multiple copies of the same asset on several physical media and storage of multiple assets on the same tape or DVD. The library application can further be used in conjunction with robotic tape libraries to track tapes that have been removed and shelved.

Moreover, the media services platform 101 provides an administration function to tailor system configuration for different customers. It is recognized that a "one size fits all" configuration for all users is non-existent. That is, each user, department, organization and customer has its own set of requirements. Therefore, the media services platform 101 supports concurrent use of multiple configurations. For example, each deployment can configure to its own user groups, create new workflows, integrate new services, support new content types, and specify new output media formats. The customer can also change and add metadata structures and fields, and integrate existing web-based applications into the user interface. The above capabilities can be executed, via the administration application, with immediate effect without shutting down the platform 101.

Additionally, in a multi-department deployment scenario, multiple logical instances of the media services platform 101 can be configured with their own unique configurations.

According to one embodiment of the present invention, the media services platform 101 can be implemented as a turn-key system within a single box—e.g., in-a-box flight case. Under this configuration, there is no need for a costly and time-consuming IT (information technology) integration undertaking to rack the components or integrate them into the customer's network. Under this arrangement, the platform 101 is be configured as a plug-and-play system, connecting to the network automatically.

Figure 2A:
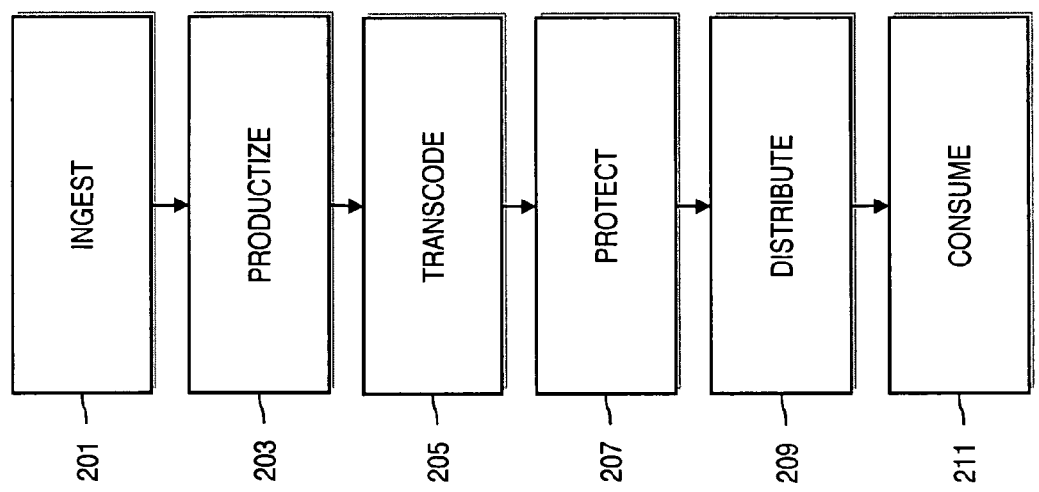
FIGS. 2A and 2B are, respectively, a diagram of a life cycle of a digital asset maintained by the system of FIG. 1, and a flowchart of process for delivering assets based on templates and profiles, according to various embodiments of the present invention.

FIG. 2A is a diagram of a life cycle of a digital asset maintained by the system of FIG. 1, according to one embodiment of the present invention. The platform 101 implements a "white label" portal, as to provide a "service bureau" approach to digital media. As shown, the life cycle includes the following functions/process: an ingest process 201, a productize process 203, a transcode process 205, a protect process 207, and a consume process 211. This life cycle, according to an exemplary embodiment, can be part of a workflow capability of the media services platform 101. For illustrative purposes, the life cycle and associated operations of the platform 101 are described with respect to music videos as the digital media; however, as noted, the digital media can be any type of media that the user considers to be assets. In terms of practical applications, music videos are useful to illustrate the retail content life-cycle and value chain.

Ingestion, as performed by the ingest process 201, is the process by which the asset is incorporated into the Digital Asset Manager 102. In other words, ingesting involves capturing content into the media services platform 101 and can occur locally or remotely with respect to the platform 101. For example, the assets may be sourced from pre-existing digital files or encoded from tape. The asset can be ingested as part of an XML envelope containing important meta-data and links to supporting files (collateral). The productize process 203 provides a process by which a user (e.g., product manager) tags the asset with additional meta-data, pricing rules, rules for digital rights management and assigns the asset to one or more distribution channels (e.g., wireless network 133, TV network 135 and broadband ISP network 137).

Once productized, the music videos can be offered as a managed service to content owners and content distributors. Such managed video service advantageously provides quick time-to-market, ease-of-use and flexibility for these owners and distributors; in this respect, the video service can be described as a "business enabler." As mentioned, music videos will be used to illustrate the retail content life-cycle and value chain. Users may browse any available music video. Revenue will be generated by advertising: advertisements will be streamed before each music video is streamed.

Via the transcode process 205, the original asset is proliferated into additional versions targeting various end-user devices. The rules for transcoding can be based upon the distribution channels selected for the asset. Once the asset has been transcoded into versions appropriate for the desired distribution channels, the transcoded versions are encrypted (e.g., Digital Rights Management) to prevent unauthorized use via the protect process 207.

After the asset is protected, the asset is distributed, per the distribute process 209, to the edge of the network where it may be staged for delivery and subsequent consumption (consume process 211). For example, consumption options for the asset include personal computers (e.g., PC/Mac), mobile phone, Windows Media Center PC, TV set top box, web-enabled devices, etc. Each of these distribution channels involves a different interface for interacting with the media services platform 101. The platform 101 can match advertisements to the amount of playback user consumes, and thus does not force the user to watch all advertisements. An exemplary delivery process utilizing templates is detailed below in FIG. 2B.

As earlier explained, the media services platform 101 provides a video editing application with a rich set of features and capabilities. Specifically, the asset can be manipulated prior to distribution, for example, to include advertisements. By way of example, the user, utilizing the proxy editor player 128 (which is the counterpart software to the proxy editor supported by the media services platform 101) on the workstation 127, can select and log the feed (assuming a live feed which is always visible), either marking in and out points manually or using an auto-clip feature for rapid logging. The user can also insert commentary and assign a rating to the video for determining which segment of the content is the most compelling content, thereby providing an indication of the selected clips that should be edited. During or after logging, the user can select clips from the log and use the proxy editor player to trim the selection. For example, the user can jog and shuttle along a timeline, or utilize a mouse wheel to scroll frame by frame to the desired cut point. The user can then preview the selection before placing it on the edit timeline. Thereafter, the user can manipulate the clips on the timeline, reorder and trim the selections. The proxy editor player 128 can permit the user to apply zoom and crop effects to close in on areas of interest; this capability is particularly valuable for broadband or mobile outputs where detail is important. The user can record a voiceover directly onto the timeline, thereby completing the edit.

The edit is then rendered as part of a workflow. In an exemplary embodiment, the edit is rendered using a high-resolution MPEG-2 master. Alternatively, an associated EDL is delivered to an integrated craft edit for completion. The media services platform 101 can support various workflows for craft editor integration, such as, store and forward, and instant editing. As for the store and forward approach, the content can be viewed, logged and edited using the proxy editor into packages for automated transcoding (from master MPEG-2) and delivery to popular non-linear editing systems (e.g., AVID Unity and AVID Media Composer, Adobe Premiere, Apple Final Cut Pro, Media 100, iFinish, Pinnacle Liquid and Vortex). With respect to instant editing, using the proxy editor player 128, the user can execute an ingest of a tape or a live feed, which can be viewed, logged and edited. The user can then export an EDL to a craft editor, which can be a third party craft editor (e.g., Incite Editor E3) that is integrated with the media services platform 101. When imported into Incite, the timeline is rebuilt frame-accurately, pointing to the MPEG-2 master on the shared SAN 103. Once the edit is complete, the craft editor creates a new MPEG-2 digital master, which is automatically re-ingested back into the platform 101 when dropped in an appropriate Hot Folder.

Figure 2B:
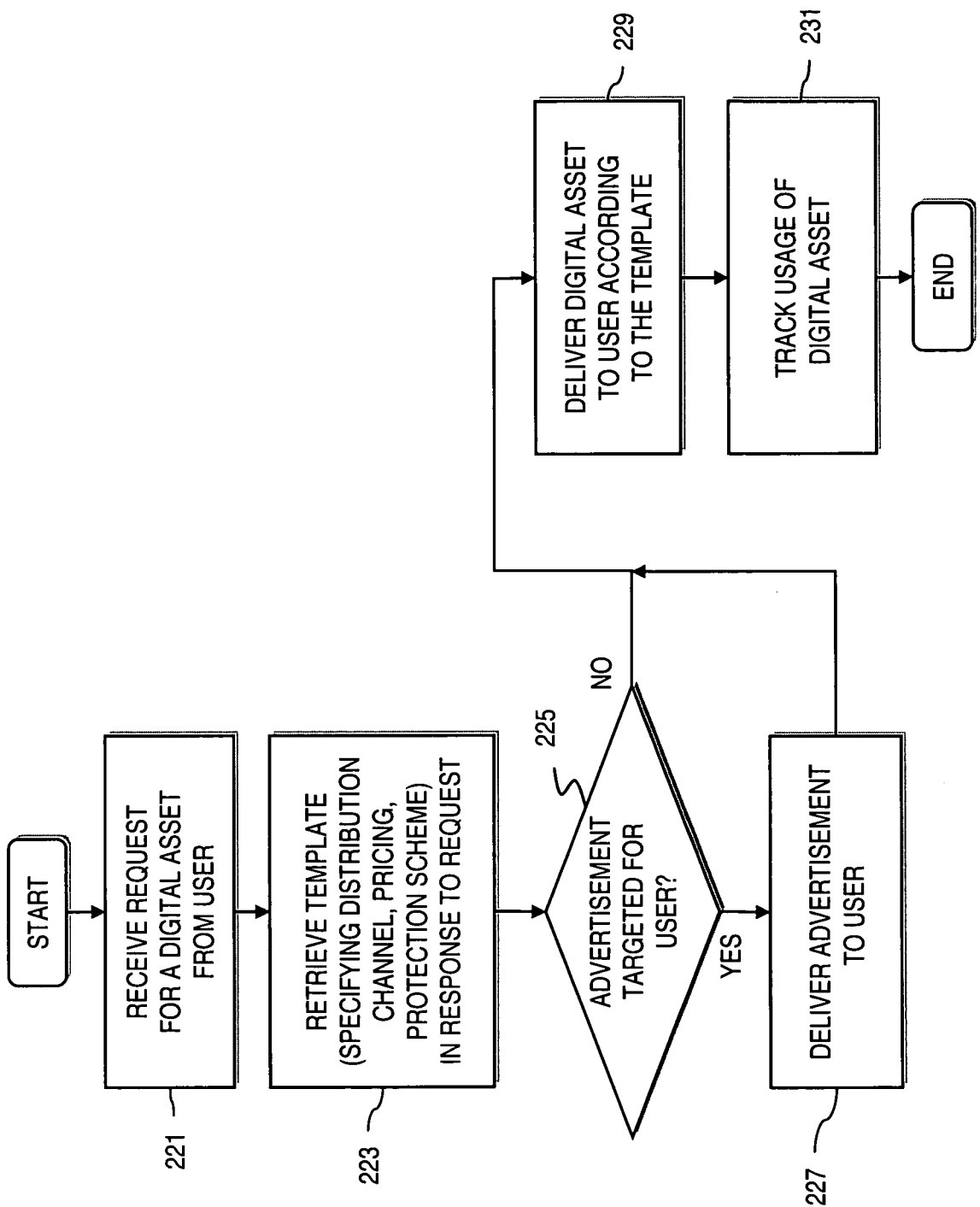

FIG. 2B shows a flowchart of process for delivering assets based on templates and profiles, according to an embodiment of the present invention. In step 221, a request is received from a user for a digital asset. The request can be made, for example, using the portal provided by the platform 101. At this point, the digital asset manager 102 retrieves a template which contains profiles and parameters relating to the delivery and accounting for digital assets (step 223). For example, the template can specify the distribution channel, pricing information, profile of the receiving device, and protection scheme to be used for the digital asset.

The digital asset manager 102 checks, as in step 225, whether the user that requested the digital media is a target for an advertisement. If indeed an advertisement has been designated for the user based on predetermined target parameters (e.g., user profile, etc.), the advertisement can be delivered to the user, per step 227. This delivery coordinated with the delivery of the digital asset. As shown, the digital asset is delivered according to the template, as in step 229. The platform 101 tracks usage of the digital asset 231 for accounting purposes.

Figure 4:
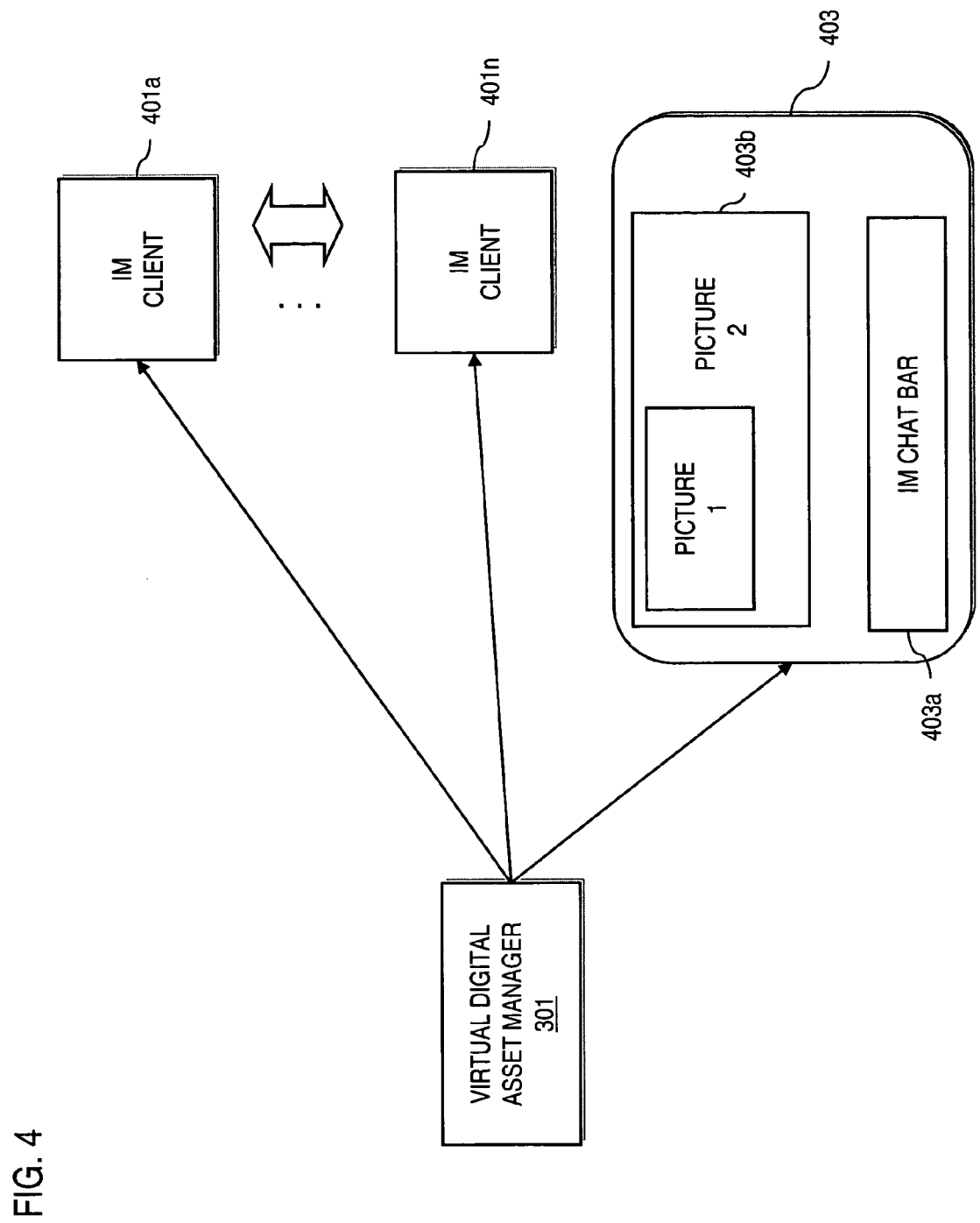
FIG. 4 is a diagram of Instant Messaging (IM) clients configured to utilize digital assets, according to one embodiment of the present invention.

As evident from the above process, the digital asset manager 102 can permit convenient delivery of digital media through the use of templates (exemplary templates are explained with respect to FIGS. 4 and 6).

Figure 3:
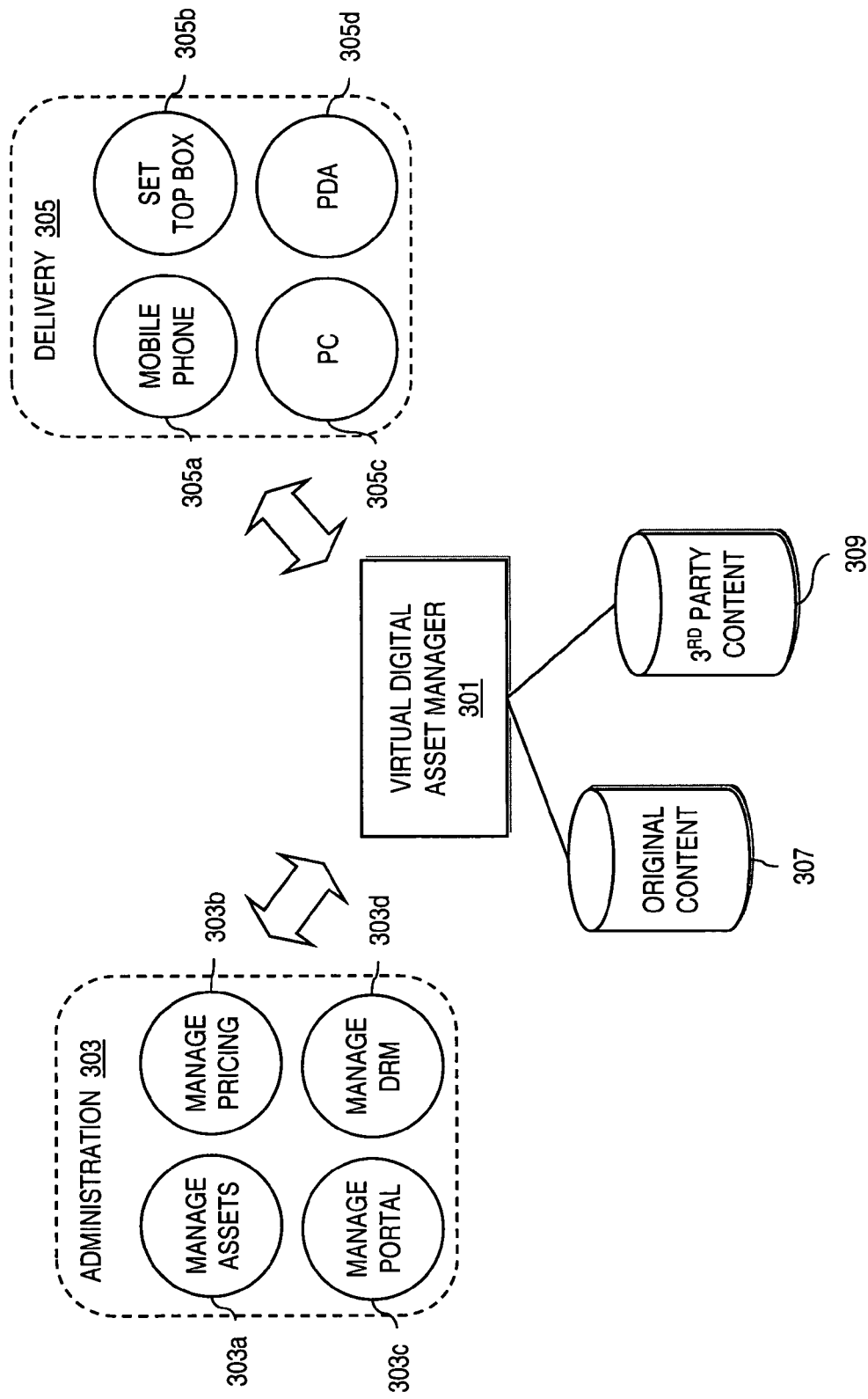
FIG. 3 is a diagram of an architecture for managing digital assets, according to one embodiment of the present invention.

FIG. 3 is a diagram of an architecture for managing digital assets, according to one embodiment of the present invention. In this example, the digital asset manager 102 (in the system of FIG. 1) is implemented as a virtual digital asset manager 301, which ensures that the digital archive can be fully integrated into the production workflow, including desktop proxy viewing, logging and editing, craft editing, and delivery. Conceptually, the virtual digital asset manager (VDAM) 301 interfaces with an administration module 303 and a delivery module 305 to provide the music video service. The administration module 303 includes a manage asset function 303a for management of the digital assets, a manage pricing function 303b for setting pricing and other accounting parameters for the assets, a manage portal function 303c for permitting users to interface with the VDAM 301, and a manage DRM function 303d for protecting (e.g., encryption) of the assets. The delivery module 305 provides distribution over various channels and associated devices—e.g., a mobile phone 305a, a set top box 305b, a PC 305c and a PDA 305d. Although the virtual digital asset manager 301 appears as a single entity in FIG. 3, the assets and associated meta-data may be distributed across a number of physical sources.

The manage asset function 303a in conjunction with the manage portal 303c function permits the asset manager 301 to enable frame-accurate remote browsing, logging and selection of thousands of hours of archive content from anywhere on the Internet or a private corporate WAN (e.g., data network 125). The asset manager 301 allows users to manage the location of content within organized folder structures and categories. Content can be modified, deleted, copied, pasted and added through this application. Folders can store any asset type configured by administrators, from audio and video to ring-tones, images and documents.

The asset manager 301 also offers a flexible search capability for the object store 119. Users can search across their own work and that of others, thus facilitating sharing and simple retrieval of content. Further, other applications within the media services platform 101 can utilize this asset search capability, as to provide a consistent and recognizable function (i.e., common dialog) across these applications.

The object store 119 enables the asset management capability of the media services platform 101, permitting users (e.g., administrators) to change the fields and forms associated with an asset at any point by utilizing the proxy editor player 128. Under this approach, adapting the platform 101 to satisfy changing user requirements does not require expensive database administrators.

In this example, the virtual digital asset manager 301 accumulates content from a variety of content databases 307 and 309, and thus is considered "virtual." A customer can generate its own content, which can be stored in the original content database 307. In addition, the content of one or more third party content providers can be offered by the asset manager 301. Accordingly, the VDAM 301 enables tying of business partners (e.g., third party content providers), thereby enhancing the distribution of digitized assets. In an exemplary embodiment, the content owner can push content into the virtual digital asset manager 301 over the world wide web (e.g., network 125). The virtual digital asset manager 301 can also provide private storage of asset data, and facilitate publishing of the content. In addition to being configured as an asset manager, the VDAM 301 can act as a directory server of all the assets provided by the users.

The users can create playlists for delivery of the assets. Also, these playlists can be generated base on a pre-defined list of "themes." Exemplary themes include: birthday party, dance party, cookout, wine tasting, romantic dinner, and bachelor party. Further, the playlists can be shared with other users across various devices.

Furthermore, it is contemplated that the virtual digital asset manager 301 can provide advertisement and transaction support. That is, a user can produce a video file that includes the stored content as well as advertisements; the manager 301 then tracks transactions relating to the retrieval and/or viewing of the edited video file. In this manner, the customer has the capability to charge or otherwise account for such services; the pricing can be specified and updated via the manage pricing function 303b. In an exemplary embodiment, the platform 101 can stream an advertisement before each music video is played and stream another advertisement at the conclusion of a playlist.

Advertisements are treated as digital assets and are ingested and managed in the system in a similar manner. However, advertisement meta-data is likely to contain different fields than other content; the meta-data can conform such standards as SMPTE, CableLabs, and MPEG7 (Multimedia Content Description Interface). Additionally, advertisement content may not be protected. It is contemplated that the advertisements can be classified and targeted (for example, by music video genre) for delivery (e.g., as part of an e-mail or IM campaign) to the users.

In addition to advertising revenue, the platform 101 can support other revenue options, including monthly subscriber fees and purchase (e.g., via shopping cart as provided by the manage portal function 303c).

The manage portal function 303c, in an exemplary embodiment, provides a variety of collaboration features for user. According to an embodiment of the present invention, the following types of users are defined:

TABLE 1

| ROLE NAME | DESCRIPTION |
| --- | --- |
| Operator | An Operator can use a web-based interface to Ingest assets into the DAM. |
| Administrator | An Administrator can use a web-based interface to manage user accounts, define distribution channels and Protection (DRM) profiles. |
| Product Manager | A Product Manager can use a web-based interface to edit any property or attribute of assets and products - including meta-data edits, setting prices and selecting pre-existing distribution channels or DRM profiles. The Product Manager can perform marketing/sales functions. |
| Unregistered User | Unregistered users may browse music videos and play the videos, for example, one at a time. |
| Member | By registering, Member users can be provided with access to music video playlist features and collaboration features - such instant messaging and e-mail. |

TABLE 1-continued

| ROLE NAME | DESCRIPTION |
| --- | --- |
| Expert | Expert users have all the rights of Member users, but may also manage their own BLOG and review/rate videos. |

For instance, registered users (i.e., "Members") can be issued a Collaboration ID linked to optional e-mail or instant messaging accounts. These members may e-mail or instant message their buddies not only on the portal itself, but through any other e-mail or instant communication systems. E-mail can allow additional advertising and direct mail capabilities; also, the e-mail client can be custom or a branded Outlook Web Access client (OWA). Users who are authorized as "Expert" (per Table 1) can be provided with additional capabilities, such as Blogging (Web Logs) and Reviewing/Rating. Accordingly, these users can "BLOG" on relevant music topics, as well as review and rate the videos. The ratings can be displayed at the time a video is displayed. These collaboration features can foster a unique sense of community among the users, thereby encouraging use of the music video services.

Effectively, the VDAM 301 supports a "most needed" based approach, rather than a "most requested" based approach of convention systems. In accordance with one embodiment of the present invention, the virtual digital asset manager 301 can be implemented external to the media services platform 101 as an independent system.

The platform 101 defines a number of objects to support services of the digital asset manager 102, as detailed in FIGS. 6A-6E.

FIG. 4 is a diagram of Instant Messaging (IM) clients configured to utilize digital assets, according to one embodiment of the present invention. In this scenario, multiple IM clients 401a-401n have connectivity to the VDAM 301, which can treat these IM clients (or devices) 401a-401n as a community of users who are interested in sharing digital assets. That is, each device 401a-401n has visibility of the other devices; for example, each user can instantly communicate with other users, as the VDAM 301 can maintain the "buddy list" of the community of users. The VDAM 301 supplies video application functionalities to support the collaborative and sharing environment, as explained with respect to FIG. 5. These functionalities provide the users with a robust experience in the retrieval and exchange of digital media. For example, an exemplary user interface 403 includes an IM window 403a for receiving user input such as text, voice chat, video chat, etc. The user interface 403 also includes a video box 403b that is capable of picture-in-picture display, such that more than one digital media streams can be viewed concurrently.

Although the above arrangement is described with respect to an instant messaging client, it is contemplated that the instant messaging "entity" or "process" can be effected using other architectures, not necessarily client-server systems.

Figure 5:
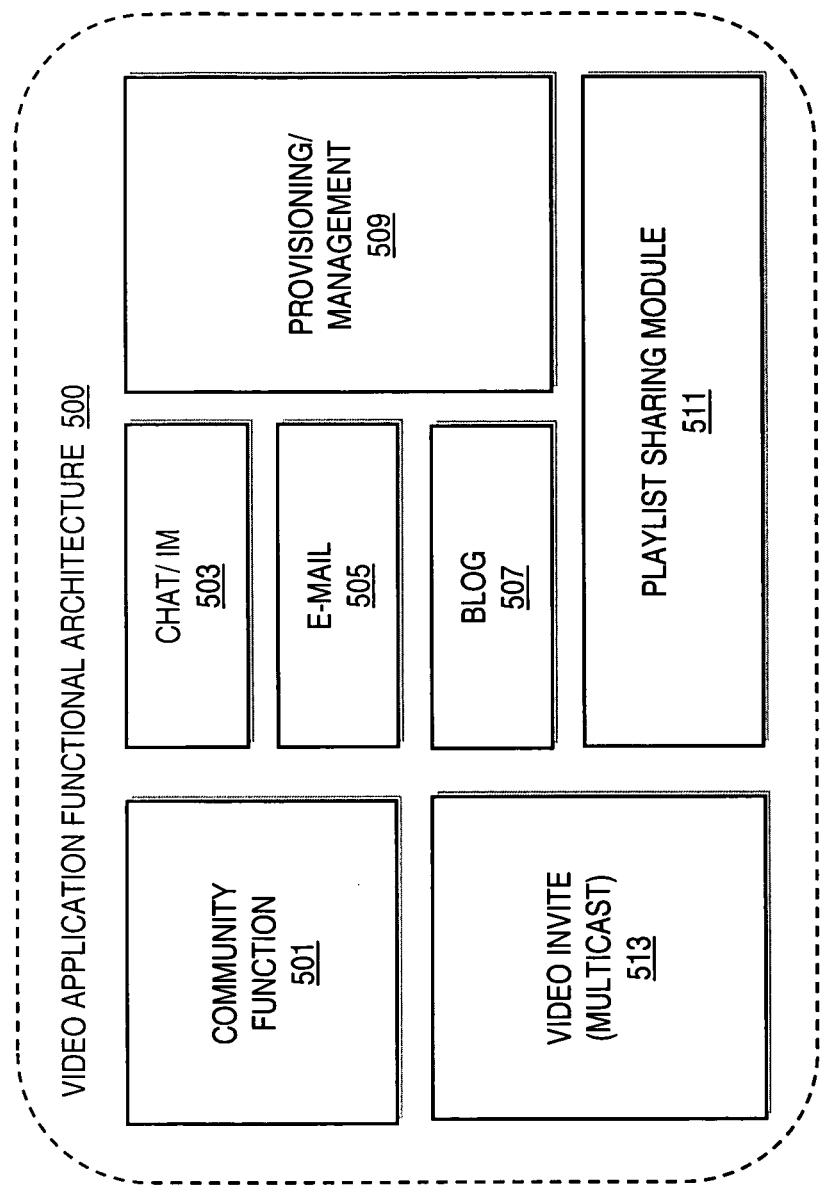
FIG. 5 is a functional diagram of a video application service, according to one embodiment of the present invention.

FIG. 5 is a functional diagram of a video application service, according to one embodiment of the present invention. Continuing with the example of FIG. 4, the VDAM 301 utilizes video application functional modules 500 to provide an engaging user experience. The modules 500 include a community function 501 to support collaborative instant messaging (or instant communications (IC)) among the IM clients 401a by maintaining buddy lists, for example. Also, communication features includes a Chat/IM 503, e-mail 505, and Blog 507 functions; these features can be utilized to comment (e.g., review and rate) on the digital media. Further, these functions 503, 505 and 507 can be provisioned and managed directly by the users (e.g., IM clients 401a-401n) through a provisioning/management module 509. Another feature is that of a playlist sharing module 511, which facilitates the capability for an IM client to share digital assets within the IM environment.

Moreover, the video application service provides a video invite module 513 that permits the community of IM clients 401a-401n to participate in a video multi-cast. The video invite module 513 schedules and coordinates the requests and responses needed to solicit participation from the IM clients 401a-401n. The video feed for this multi-cast can be a live video feed. For instance, a content owner can readily host a video launch party to its consumers.

The above functions are provided by the VDAM 301, which implements such functions using one or more objects, as explained below.

Figure 6A:
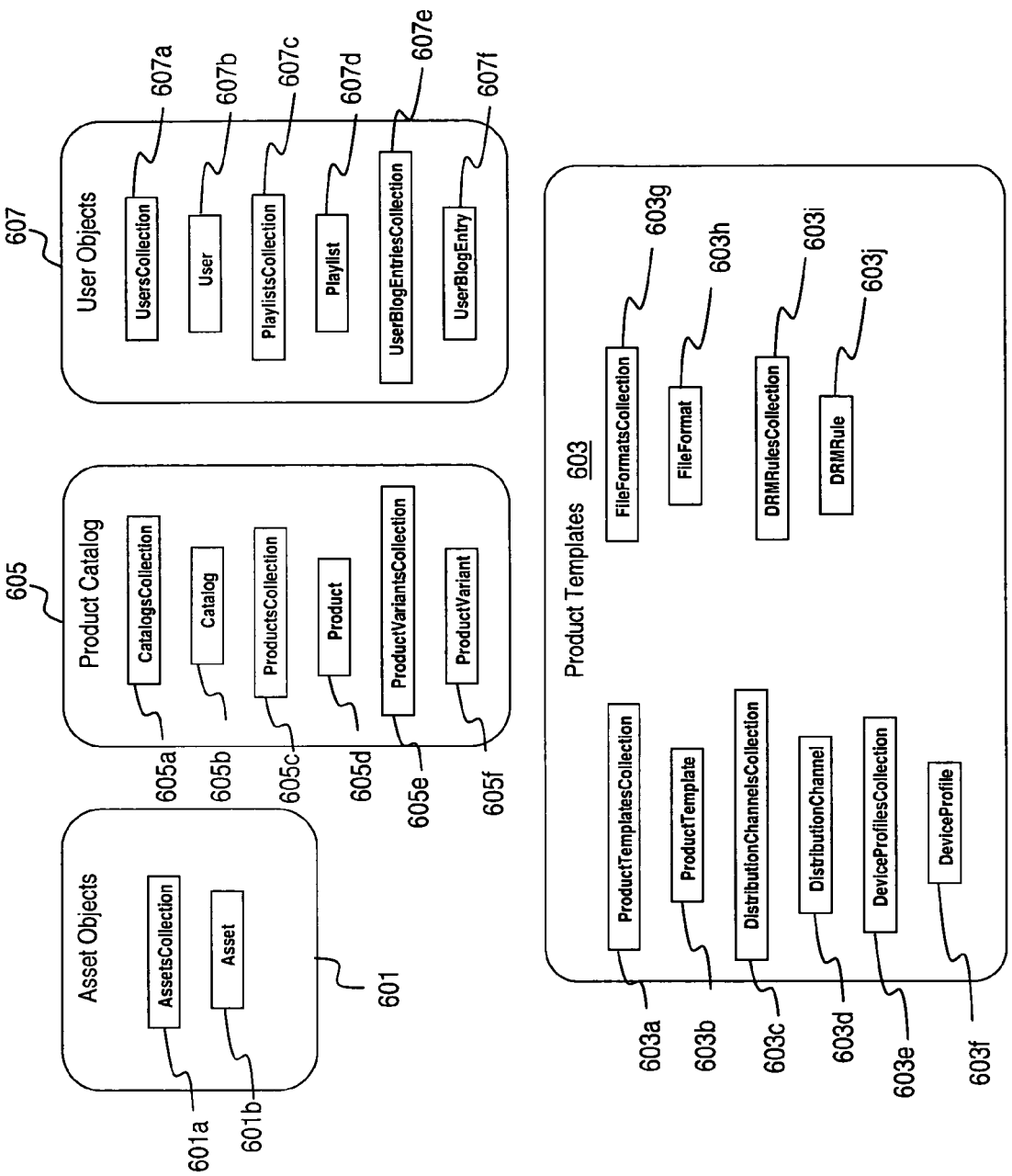
FIGS. 6A-6E are diagrams of exemplary objects for supporting digital asset management, according to one embodiment of the present invention.

FIG. 6A is a diagram of exemplary objects for supporting digital asset management, according to one embodiment of the present invention. By way of example, Table 1 defines the following objects: Asset objects 601, Product Template objects 603, Product Catalog objects 605, and User objects 607. Product templates can be used for publishing and delivery of the digital media over any number of distribution channels.

TABLE 2

| NAME | DESCRIPTION |
| --- | --- |
| AssetsCollection 601a | One or more Asset objects. |
| Asset 601b | All meta-data describing an asset, including title, album, artist, genre, etc. Extensible structure so that additional properties may be added. |
| ProductTemplatesCollection 603a | One or more ProductTemplate objects. |
| ProductTemplate 603b | Product Template objects encapsulate Distribution Channels, DRM Rules (Product Offer) and Pricing. Product Templates may be applied to a Product at any time. |
| DistributionChannelsCollection 603c | One or more DistributionChannel objects. |
| DistributionChannel 603d | Distribution Channels describe a targeted platform (such as Web Delivery, Mobile Phone, MCE, and STB) as well a distribution partner (if applicable). |

TABLE 2-continued

| NAME | DESCRIPTION |
|---|---|
| DeviceProfilesCollection 603e | One or more DeviceProfile objects. |
| DeviceProfile 603f | Describes a targeted device. For example: For the Distribution Channel "Web Delivery", there may be two Device Profiles defined: PC and Mac. For a Distribution Channel targeting mobile phone users, there could be a dozen or more device profiles - representing the devices available to a particular carrier's subscribers. |
| FileFormatsCollection 603g | One or more FileFormat objects. |
| FileFormat 603h | File Format describes the codec, bit rate and resolution to which an asset can be transcoded. For some DeviceProfiles, there may be more than one applicable file format. For example, for a "PC" Device Profile, multiple File Formats could be offered (Windows Media, QuickTime, Real, etc.) and in various bit rates targeting the user's connection speed (dial-up, broadband, cable). For other device profiles - such as mobile phones —there will likely only be a single File Format. |
| ProductOffersCollection (DRMProfilesCollection) 603i | One or more ProductOffer objects. |
| DRMRulesCollection 603i | One or more DRMRule objects. |
| DRMRule 603j | A specific DRM rule. For example: File may be played 5 times only, File will only play for 24 hours, etc. |
| EdgeLocationsCollection 603m | One or more EdgeLocation objects. |
| EdgeLocation 603n | A Distribution Channel may have one or more Edge Locations to which content may be delivered. |
| CatalogsCollection 605a | One or more Catalog objects. |
| Catalog 605b | A single Catalog object will likely contain all Products. An alternate scenario involving a multi-tenant environment may divide the products into multiple Catalogs based on content owner. |
| ProductsCollection 605c | One or more Product objects. |
| Product 605d | Represents the marriage of an asset with Pricing, DRM Rules and Distribution Channels. |
| ProductVariantsCollection 605e | One or more ProductVariant objects. |
| ProductVariant 605f | Product Variants are created based on the Distribution Channels, Device Profiles and File Formats specified for a Product. A Product Variant will be created for each unique File Format of the music video offered. |
| UsersCollection 607a | One or more User objects. |
| User 607b | Describes an end user. Properties are populated differently for each end user type: Unregistered, Member and Expert. |
| PlaylistsCollection 607c | One or more Playlist objects. |
| Playlist 607d | List of Products to be played. |
| UserBlogEntriesCollection 607e | One or more UserBlogEntry objects. |
| UserBlogEntry 607f | BLOG entry entered by a User. |

Figure 6B:
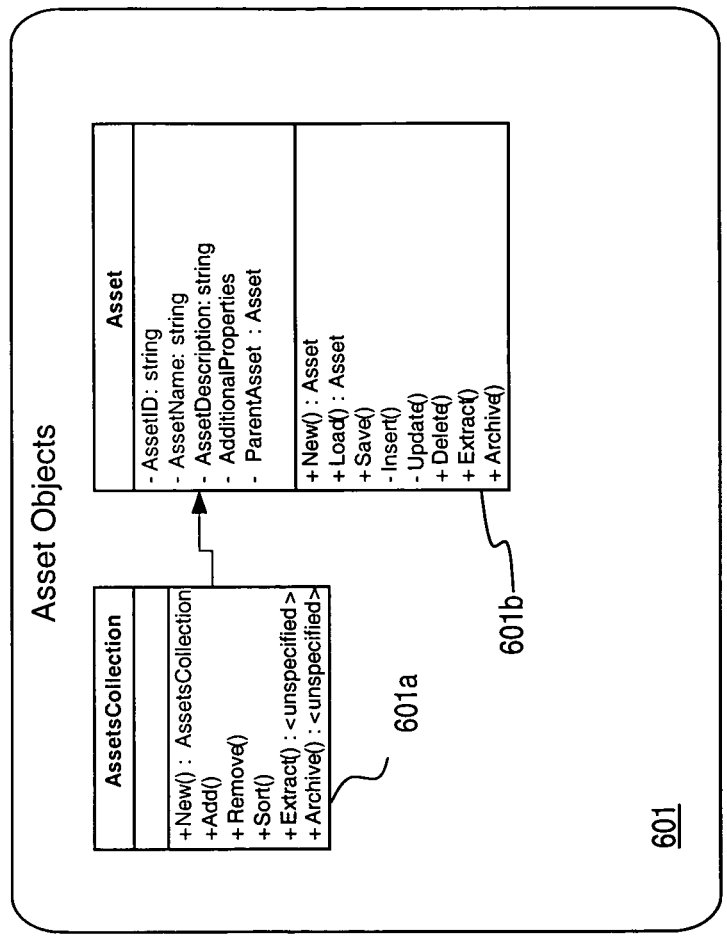

FIG. 6B is a diagram of asset objects and associated attributes for supporting digital asset management, according to one embodiment of the present invention. For all classes representing single objects (versus classes representing collections of objects), the following behaviors (or methods) are defined:

TABLE 3

| NAME | DESCRIPTION |
|---|---|
| New | Object constructor. |
| Load | Retrieves the object from a data source - e.g., a database. |
| Save | Public method persists object data to the data source. |
| Insert | Private method called by public Save method. Inserts a new object in the data source. |

TABLE 3-continued

| NAME | DESCRIPTION |
|---|---|
| Update | Private method called by public Save method. Updates an existing object in the data source. |
| Delete | Public method deletes the object data from the data source. |

For all classes representing object collections, the following methods were defined:

TABLE 4

| NAME | DESCRIPTION |
|---|---|
| New | Instantiates the collection. |
| Load | Retrieves the collection from a data source - e.g., a database. |
| Add | Adds an object to the collection. |

TABLE 4-continued

| NAME | DESCRIPTION |
| --- | --- |
| Remove | Removes an object from the collection. |
| Sort | Sorts the collection. Method will allow the caller to define which object property to sort by. |

Table 5, below, defines the behaviors of the asset objects 601:

TABLE 5

| OBJECT NAME | METHOD NAME | DESCRIPTION |
| --- | --- | --- |
| Asset | Load | Public method; retrieve all meta-data regarding an Asset (but not the asset itself). |
| Asset | Extract | Public method; Retrieves the physical file representing the asset from the DAM. |
| Asset | Archive | Public method; archives the asset in the DAM. |
| AssetsCollection | Extract | Performs an extract on each asset in the collection, returning a collection of files. |
| AssetsCollection | Archive | Archives each asset in the collection. |

Object attributes (or properties) have been added to the objects described above. For all classes representing single objects (versus classes representing collections of objects), the following attributes were defined:

TABLE 6

| NAME | DESCRIPTION |
| --- | --- |
| ID | Defined as a string; GUID's can be used to uniquely identify object instances. |
| Name | Text field containing the object name. |
| Description | Text field describing the object instance. |

Figure 6C:
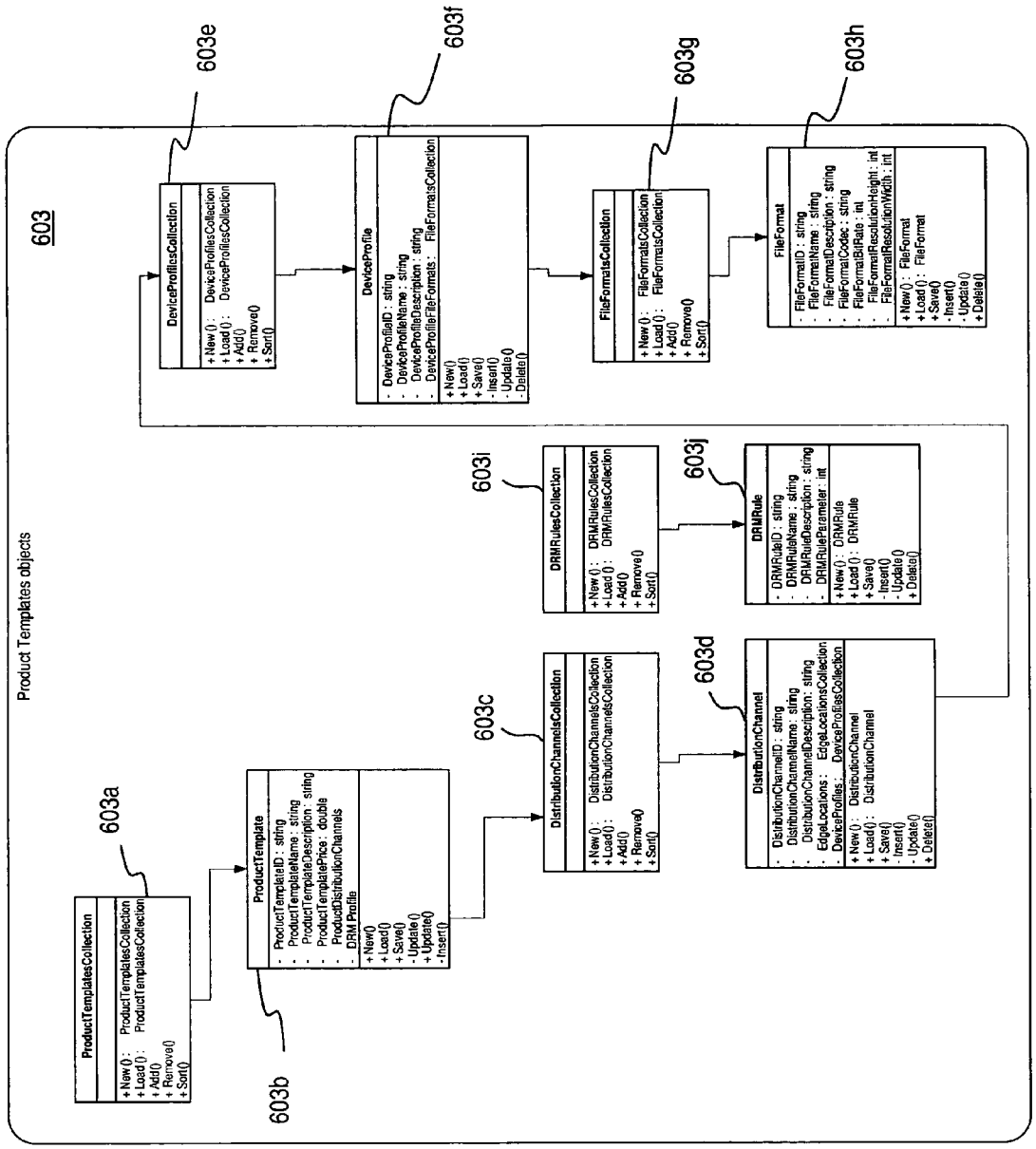
Figure 6D:
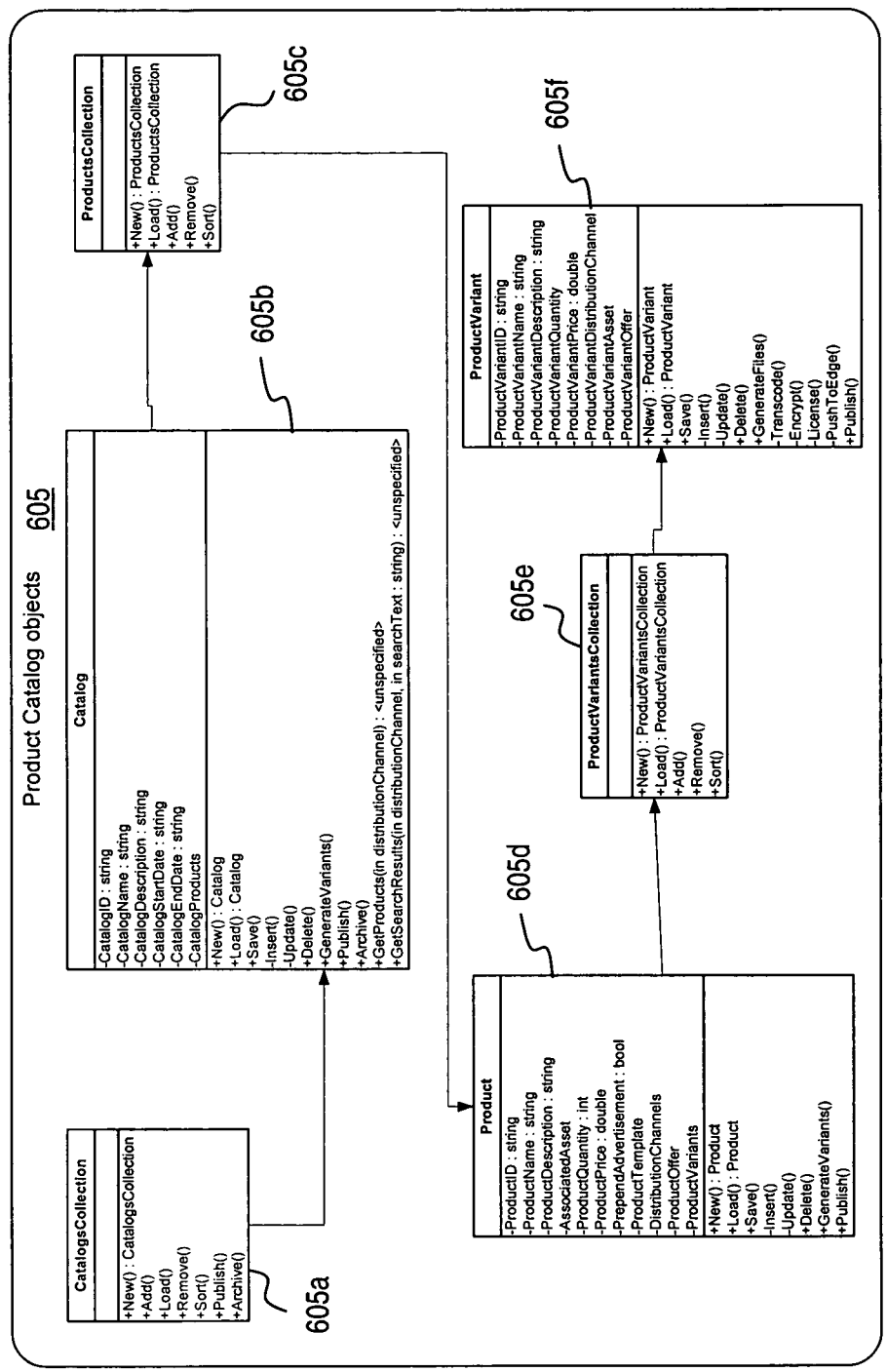

FIG. 6C is a diagram of product template objects and associated attributes for supporting digital asset management, according to one embodiment of the present invention. Product Templates permit a Product Manager to quickly and easily "productize" assets. The Product Template objects 403 encapsulate Distribution Channels, DRM Rules and Pricing. The Product Templates 403 may be applied to Product(s) at any time. The Distribution Channels, DRM Rules (Product Offers) and Pricing may be overridden in underlying ProductsVariants. It is noted that if a user updates a Product Template, changes are not necessarily cascaded to Products.

The Distribution Channels encapsulate Device Profiles and Edge Locations. The Device Profiles encapsulate File Formats.

Product Catalog behaviors are defined as follows:

TABLE 7

| OBJECT NAME | METHOD NAME | DESCRIPTION |
| --- | --- | --- |
| Catalog | GenerateVariants | Public method; precursor to publishing of catalog. Generates all required file formats. Calls GenerateVariants method for each Product in the catalog. |

TABLE 7-continued

| OBJECT NAME | METHOD NAME | DESCRIPTION |
| --- | --- | --- |
| Catalog | Publish | Public method; makes the catalog available to the public; calls the Publish method for each Product in the Catalog |
| Catalog | Archive | Public method; removes the Catalog from public access. |
| Catalog | GetProducts | Retrieves all Products and associated Product Variants based on a specified Distribution Channel |
| Catalog | GetSearchResults | Retrieves all Products and associated Product Variants based on a specified Distribution Channel and a user-entered text string. |
| Product | GenerateVariants | Public method; precursor to Product publishing. After a Template is applied to a Product, the Product is expanded into one or more ProductVariants based on the Distribution Channel, Device Profiles and File Formats. |
| Product | Publish | Public method; Makes the Product available to the public; Call the Publish method for each ProductVariant based on the Product. |
| ProductVariant | GenerateFile | Public method; calls the private Transcode, Encrypt, License and PushToEdge methods for a Product Variant. A Product Variant should have a 1-to-1 relationship with a File Format. |
| ProductVariant | Transcode | Private method; Transcodes the Product into all File Formats specified in the parent Product's Distribution Channels and Device Profiles. |
| ProductVariant | Encrypt | Private method; Protect the file by with encryption. For Windows Media 9 DRM, a unique identifier and a hyperlink to a licensing server are inserted into the file's header. |
| ProductVariant | License | Private method; Push the Product Variant's DRM Rules out to a licensing server on the edge of the network. |
| ProductVariant | PushToEdge (Replicate) | Private method; Push the file to all applicable Edge Servers (based on Distribution Channel). Once on the Edge, the file is publicly available. |

FIG. 6C is a diagram of product catalog objects and associated attributes for supporting digital asset management, according to one embodiment of the present invention. As shown, the Catalog object 605b contains a ProductsCollection object 605c. The Product object 605d contains the DistributionChannelsCollection object 603c and the ProductVariantsCollection 605e. The ProductVariant object 605f can include a DistributionChannel object 603d and allows the ProductOffer object 603j to be overridden. Both Product and ProductVariant classes have a 1-to-1 relationship with an Asset object 601b.

Table 8 defines the behaviors of the product catalog:

TABLE 8

| OBJECT NAME | METHOD NAME | DESCRIPTION |
| --- | --- | --- |
| Catalog | GenerateVariants | Public method; Precursor to publishing of Catalog. Generates all required File Formats. Calls GenerateVariants method for each Product in the Catalog. |
| Catalog | Publish | Public method; Makes the Catalog available to the public; Calls the Publish method for each Product in the Catalog |
| Catalog | Archive | Public method; removes the Catalog from public access. |
| Catalog | GetProducts | Retrieves all Products and associated Product Variants based on a specified Distribution Channel |
| Catalog | GetSearchResults | Retrieves all Products and associated Product Variants based on a specified Distribution Channel and a user-entered text string. |
| Product | GenerateVariants | Public method; precursor to Product publishing. After a Template is applied to a Product, the Product is expanded into one or more ProductVariants based on the Distribution Channel, Device Profiles and File Formats. |
| Product | Publish | Public method; Makes the Product available to the public; Call the Publish method for each ProductVariant based on the Product. |
| ProductVariant | GenerateFile | Public method; calls the private Transcode, Encrypt, License and PushToEdge methods for a Product Variant. A Product Variant should have a 1-to-1 relationship with a File Format. |
| ProductVariant | Transcode | Private method; Transcodes the Product into all File Formats specified in the parent Product's Distribution Channels and Device Profiles. |
| ProductVariant | Encrypt | Private method; Protect the file by with encryption. For example, for Windows Media 9 DRM, a unique identifier and a hyperlink to a licensing server are inserted into the file's header. |
| ProductVariant | License | Private method; Push the Product Variant's DRM Rules out to a licensing server on the edge of the network. |
| ProductVariant | PushToEdge (Replicate) | Private method; Push the file to all applicable Edge Servers (based on Distribution Channel). Once on the Edge, the file is publicly available. |

Figure 6E:
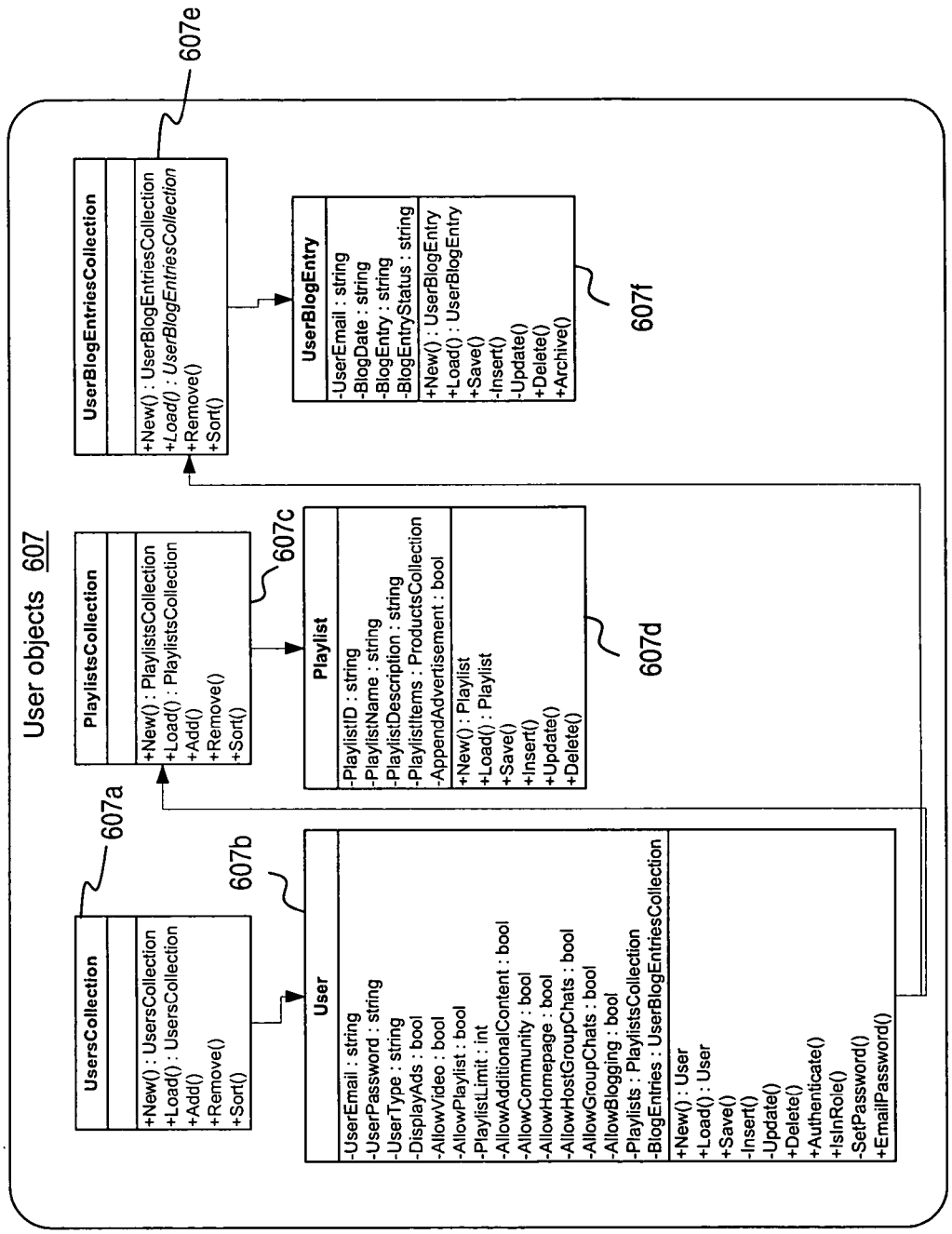

FIG. 6E is a diagram of users object and associated attributes for supporting digital asset management, according to one embodiment of the present invention. The User object 607 contains a PlaylistsCollection 607d and a UserBlogEntriesCollection 607e. The behaviors for the User object 607 as enumerated below in Table 8:

TABLE 9

| OBJECT NAME | METHOD NAME | DESCRIPTION |
| --- | --- | --- |
| User | Authenticate | Authenticate the user email and password against the data store. |
| User | IsInRole | Check user's authority. |
| User | SetPassword | Special logic may be required to enforce password rules. |
| User | EmailPassword | If a user forgets his/her password, the system can e-mail the password. |

Figure 7:
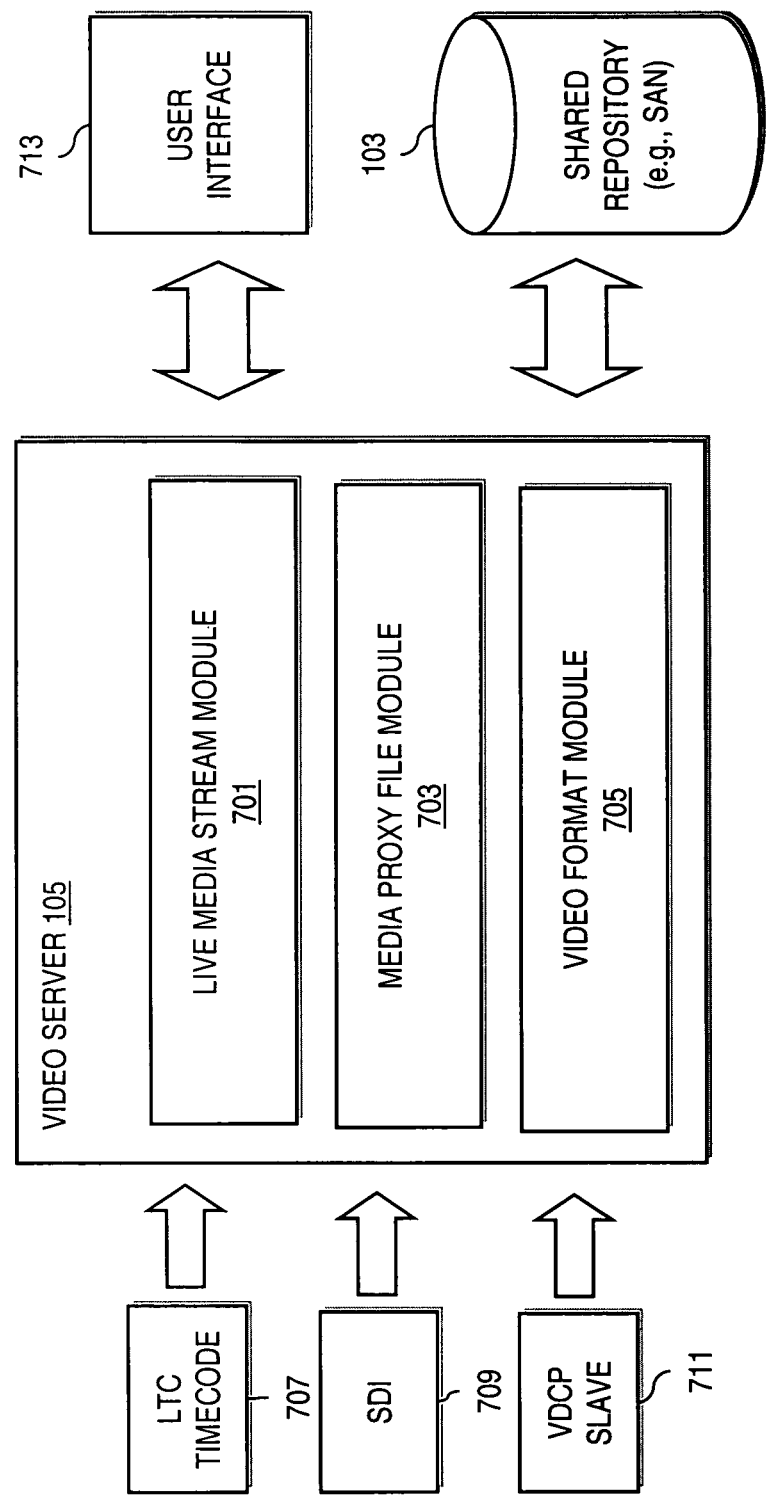
FIG. 7 is a function diagram of a video server in the system of FIG. 1, according to one embodiment of the present invention.

FIG. 7 is a function diagram of a video server in the system of FIG. 1, according to one embodiment of the present invention. As mentioned, the video server 105, among other functions, is capable of handling live broadcast video in a flexible, feature rich and cost-effective manner. In this example, the video server 105 can be slaved by a Video Disk Communications Protocol (VDCP)-compliant automation system. It is noted that the video server 105 can support both National Television System Committee (NTSC) and Phase Alternating Line (PAL) standards. The video server 105 is controllable from any user workstation (e.g., workstation 127) without geographical constraint. The video server 105 can in turn control, for instance, an attached video tape recorder (VTR) over an RS-422 interface, thereby allowing frame-accurate recording and lay back to tape, and preserving timecode through the entire process.

In one embodiment, the video server 105 includes a live media stream module 701, a media proxy file module 703, and a video format module 705. The live media stream module 701 communicates with the user interface 713 to provide logging and monitoring functions. The media proxy file module 703 supports the capability to perform editing functions during recording of the video. The video format module 705 converts a raw video stream into a standardized format—MPEG-2, for example. The modules 703 and 705 interface the repository 103 to store the ingested contents.

As shown, the server 105 can support various input sources: an LTC time code source 707, a Serial Digital Interface (SDI) source 709, and a VDCP slave source 711. The video server 105 can generate multiple outputs in real-time from the SDI source 707, in contrast to conventional video servers which generate only a single output. The modules 701, 703, 705 generate three types of outputs. One output is that of MPEG-2, in which the user can select between long-GOP and I-frame for each server, ranging from DVD-quality 5 Mbps long-GOP to 50 Mpbs I-frame only. The audio is captured at 48 kHz, for instance. The live media stream module 701 can generate a live media stream (e.g., Windows Media 7 Series) for broadcast over a network (e.g., networks 133-137 of FIG. 1) to one or more media servers (e.g., media server 121), which serve the stream on to individual user workstations. The stream can include SMPTE timecode, thereby providing a frame-accurate source for live logging.

Finally, the media proxy file module 703 can produce a file (e.g., Windows Media proxy file) for storage in the SAN 103. The proxy editor permits this file, according to one embodiment, to be opened for viewing and editing while the file is still being written. Thus, in conjunction with the proxy editor, the video server 105 supports fast-turnaround production of live events without the need for dedicated high-bandwidth networks and expensive edit suites, and without sacrificing quality or functionality.

In addition to the robust video editing functionality, the media services platform 101 provides management of the digital assets, as next explained.

Figure 8:
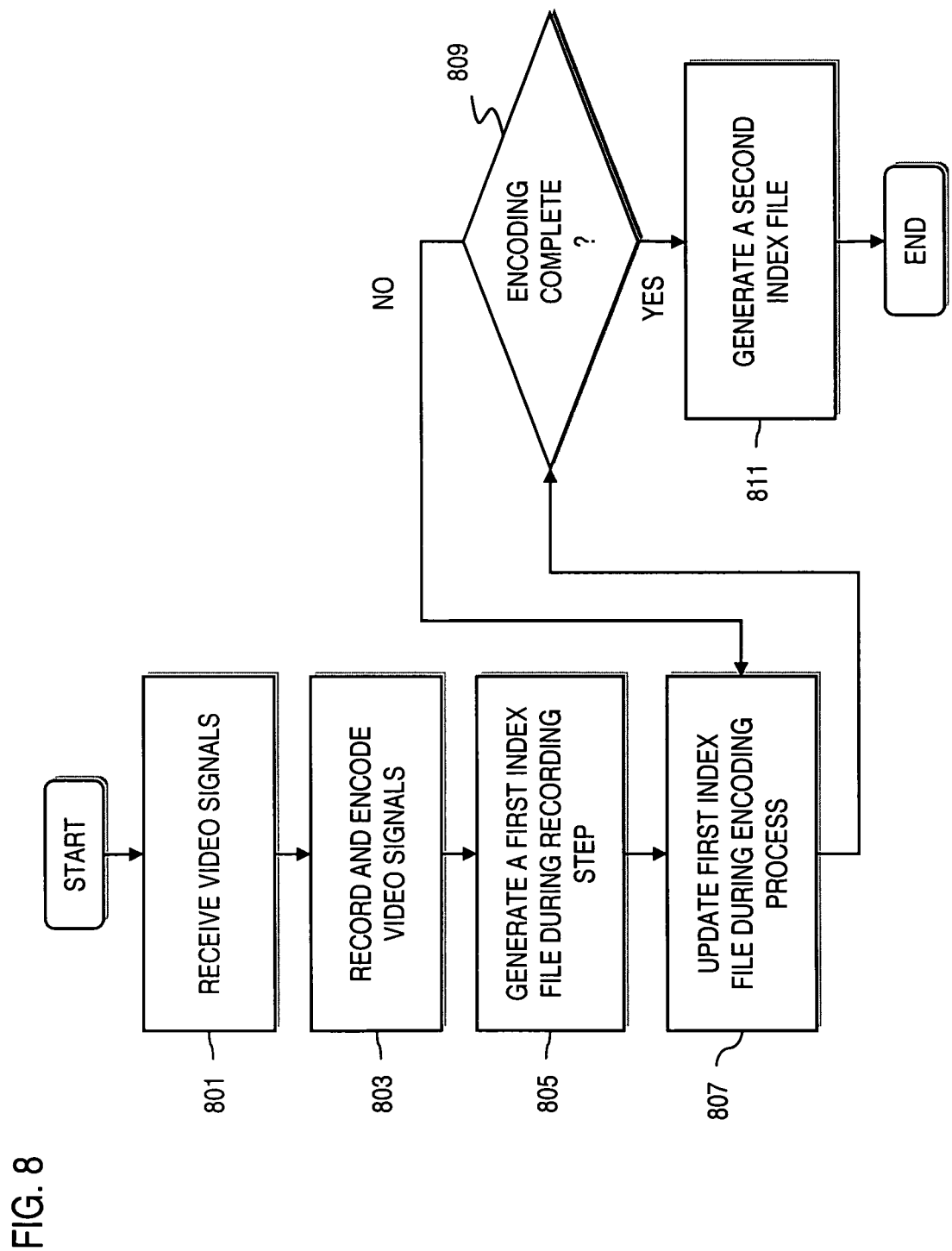
FIG. 8 is a flowchart of an indexing process to enable distributed editing over a data network, according to an embodiment of the present invention.

FIG. 8 is a flowchart of an indexing process to enable distributed editing over a data network, according to an embodiment of the present invention. Conventionally, to support editing, an index file is generated for addition to the end of the video file. The media services platform 81 provides a mechanism, whereby during recording and encoding of a video file, editing can be concurrently performed. This is enabled by created of a supplemental index file that is separate from the conventional index file. The separate index file is updated dynamically at intervals during recording and encoding. This index can be added to the video file when recording and encoding has been completed; optionally, the separate index file can then be deleted. Video frames for use in the editing process are created using data in the video file and the separate index file.

In step 801, video signals are received by the platform 81; namely, through the video server 85. The video signals are then recorded and encoded, as in step 803. In step 805, the first index file is generated during the recording. This first index file is updated during the encoding process (step 807). In other words, while the video file is being recorded and subjected to encoding (e.g., GOP encoding), a separate index file is created and updated at regular intervals during the encoding process. Typically, the updating of the index file can occur every half a second. If the encoding process is complete (as determined in step 809), then a second index file (i.e., conventional index file) is generated, as in step 811. Otherwise, the update of the first index file is continued.

If the editing application attempts to connect to a video file and cannot locate the index at the end of the file, the application will look automatically for the separate index file. The index file could be assigned the same name as the basic video (or media) file, but with a different extension—although mapping to any name of file could be used. If an appropriate index file (which can indicate a different file extension than the video file) is found, the editor uses this external index to play/render the file, which is still being recorded. This results in the editor being able to access content rapidly (e.g., within a one second maximum of the content being recorded). Once recording stops and the conventional index is added to the end of the video file, the external index file can be deleted as no longer necessary.

The above process can be applied to any GOP based video format (including Windows Media).

Figure 9:
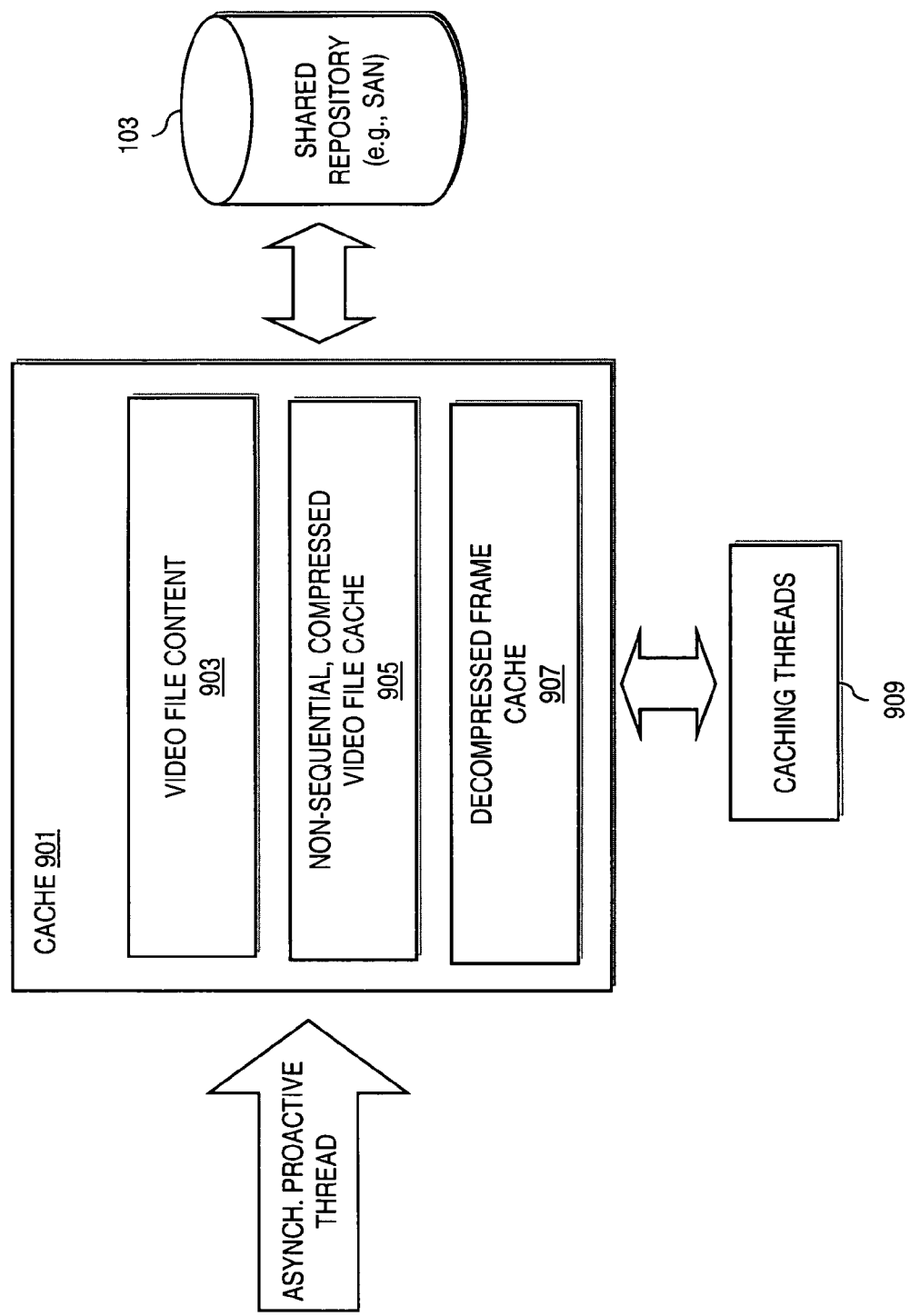
FIG. 9 is a diagram of a cache architecture for storing media, according to an embodiment of the present invention.

FIG. 9 is a diagram of a cache architecture for storing and manipulating media, according to an embodiment of the present invention. To offer the flexible, robust editing functions, a software-based, intelligent video cache system 901 is utilized. The system 901 enables frame accurate scrubbing and editing of GOP based content. Due to the processor demand in decoding GOP based content, GOP based editing has been implemented conventionally as hardware based functionality. This aspect of the present invention provides a caching architecture which removes this requirement and enables software based real-time long GOP editing. This architecture is implemented by the editing application of the media services platform 101.

The architecture of the intelligent video cache system 901 has a number of layers: a video file content layer 903; a non-sequential, compressed video file cache 905; and a decompressed frame cache 907. The video file content layer 903 provides for locally hosted video file content. The second layer 905 provides for a compressed video file cache within a client player. This cache 905 is non-sequential so that only parts of the video file (at GOP resolution) can be cached. In one embodiment, the cache 905 is maintained in main memory (e.g., Random Access Memory (RAM)) of the workstation 127, but can be aged by the player software to local disk. Also, within the client player, the decompressed frame cache 907 is provided in video memory (VRAM).

In this example, the cache 901 is filled by asynchronous proactive caching threads 909, which follow and predict user behavior patterns as well as fill the different layers 903, 905 and 907 of the cache 901 as required to provide the best editing experience (within the constraints of the local workstation resources in terms of Central Processing Unit (CPU), RAM, disk and VRAM). The asynchronous aspect of the system is significant, and provides the user with an immediate response when scrubbing throughout a file or editing. If the system has not yet cached the desired frame, the player software can show the closest cached/decompressed frame and display a status symbol indicating to the user that the current frame is not the correct frame. If the user waits, eventually that frame will render into the correct frame. The user interface is not locked by the caching mechanism—i.e., the user can always choose to scrub somewhere else, play, etc. Furthermore, cache requests can be configured to have an expiry timeout, enabling cancellation to avoid building long queues of caching requests (which could no longer be relevant).

The following modes of operation of the editor player 128 are considered: idle, scrubbing, and playing. In idle mode, when the player has not changed state within a predetermined period of time (e.g., such as in the last 2 seconds), a playback caching thread first ensures that it has cached the next few seconds forward and backward from the playback head position. The thread ensures that the content is cached in decompressed VRAM cache 907. In this manner, if the user suddenly decides to play, the system can respond immediately. Once the playback caching thread is satisfied that the content is cached for immediate playback, the riddling thread is started.

The job of the riddling thread is to proactively download frames throughout the video in case the user starts scrubbing. The thread first downloads a GOP in the middle of the file, then every third of the file, then every ninth of the file, etc. This continues until the VRAM is full (it always leave the playback thread immediate playback content, but can replace other frames which have been cached and are no longer relevant). Once the VRAM is full, the thread continues—but only to the compressed RAM cache and disk cache. If enough resources exist on the workstation 127 and time is left in idle mode, the full video can be cached in the compressed cache.

The scrubbing mode is triggered by fast "playback head" movement, by a user operating an on screen editing tool (when not in play mode). The playback caching thread is disabled and all resources are given to the riddling thread to provide the best scrubbing experience.

When a play "button" is selected by a user within the proxy editor player 128, the playing mode is triggered. In this mode, the playback caching thread, and the riddling thread are disabled. A look-ahead caching thread is started which decompresses into VRAM the content ahead, and faster (if there are sufficient system resources) than the playback head.

The processes described herein for managing digital assets may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
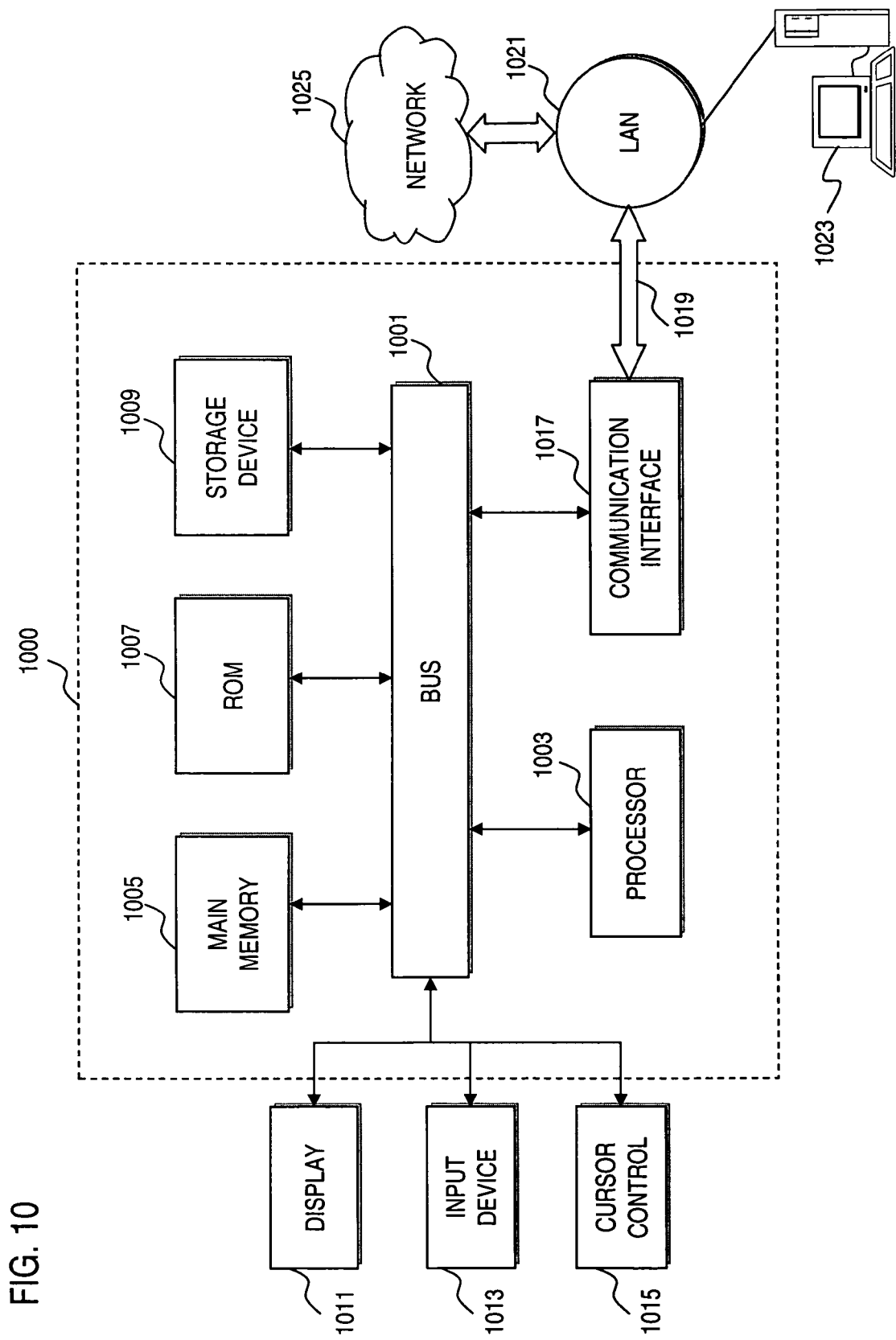
FIG. 10 is a diagram of a computer system that can be used to implement various embodiments of the present invention.

FIG. 10 illustrates a computer system 1000 upon which an embodiment according to the present invention can be implemented. For example, the processes described herein can be implemented using the computer system 1000. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to one embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the present invention. Thus, embodiments of the present invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the present invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

The following patent applications are incorporated herein by reference in their entireties: pending U.S. patent application Ser. No. 11/368,750 filed Mar. 6, 2006, entitled "Method and System for Providing Distributed Editing and Storage of Digital Media Over a Network"; U.S. Pat. No. 8,126,313 issued Feb. 28, 2012, entitled "Method and System for Providing a Personal Video Recorder Utilizing Network-Based Digital Media Content"; pending U.S. patent application Ser. No. 11/517,023 filed Sep. 7, 2006, entitled "Method and System for Providing Remote Digital Media Ingest with Centralized Editorial Control"; pending U.S. patent application Ser. No. 11/452,851 filed Jun. 14, 2006, entitled "Method and System for Providing Digital Media Management Using Templates and Profiles"; U.S. Pat. No. 8,005,345 issued Aug. 23, 2011, entitled "Method and System for Dynamic Control of Digital Media Content Playback and Advertisement Delivery"; co-pending U.S. Pat. No. 7,970,260 issued Jun. 28, 2011, entitled "Digital Media Asset Management System and Method for Supporting Multiple Users"; and pending U.S. patent application Ser. No. 11/517,015 filed Sep. 7, 2006, entitled "Method and System for Delivery of Digital Media Experience via Common Instant Communication Clients."

APPENDIX

3G $3^{rd}$ Generation
AAF Advanced Authoring Format
API Application Programming Interface
ASIC Application Specific Integrated Circuit
CD Compact Disc
CPU Central Processing Unit
CRT Cathode Ray Tube
DAM Digital Asset Manager
DSL Digital Subscriber Line
DRM Digital Rights Management
DVD Digital Versatile Disc (formerly Digital Video Disc)
EDL Edit Decision List
EPROM Erasable Programmable Read Only Memory
FPGA Field Programmable Gate Array
GOP Group of Pictures
GUI Graphical User Interface
IIS Internet Information Services
IM Instant Messaging
IP Internet Protocol
ISDN Integrated Digital Services Network
ISP Internet Service Provider
LAN Local Area Network
LTC Longitudinal TimeCode
MPEG Motion Picture Expert Group
NAS Network Area Storage
NTSC National Television System Committee
NIC Network Interface Card
PAL Phase Alternating Line
PCMCIA Personal Computer Memory Card International Association
PDA Personal Digital Assistant
PROM Programmable Read Only Memory
RAM Random Access Memory
ROM Read Only Memory
RFC Request For Comment
RPID Rich Presence Information Data Format
SAN Storage Area Network
SDI Serial Digital Interface
SLA Service Level Agreement
SMPTE Society of Motion Picture and Television Engineers
SQL Structured Query Language
TV Television
UMTS Universal Mobile Telecommunications System
VDAM Virtual Digital Asset Manager
VDCP Video Disk Communications Protocol
VOD Video On Demand
WAN Wide Area Network
WLAN Wireless Local Area Network
XML Extensible Markup Language

What is claimed is:

1. A method for providing digital assets, the method comprising:
   transmitting a digital asset to one of a plurality of devices configured to support instant communications, wherein the digital asset is specified by a playlist that is created by one of the devices, the one device transmitting the playlist to another one of the devices;
   facilitating sharing of the digital asset among the devices;
   providing a portal for users of the devices to manage respective instant communications accounts.

2. A method according to claim 1, further comprising:
   establishing a community for the users by maintaining a list of the associated devices participating in the instant communications.

3. A method according to claim 1, further comprising:
   sending requests to the devices for inviting the devices to receive the digital asset, wherein the digital asset includes a video stream and is displayed within an instant communications environment.

4. A method according to claim 1, further comprising:
retrieving the digital asset from a central repository that is managed by a service provider, central repository includes content from a third party content provider.

5. A method according to claim 1, wherein one of the devices is configured as editor, the method further comprising:
permitting the one device to edit the digital asset.

6. A method according to claim 1, wherein the portal permits the users to comment on the digital asset via an e-mail service or a blog service.

7. A method according to claim 6, wherein the portal is configured to permit provisioning and management of the e-mail service or the blog service.

8. A method according to claim 1, further comprising:
transmitting a plurality of digital assets to one of the devices, the one device being configured to display the digital assets concurrently.

9. A system for providing digital assets, the system comprising:
a server configured to transmit a digital asset to one of a plurality of devices configured to support instant communications, wherein the digital asset is specified by a playlist that is created by one of the devices, the one device transmitting the playlist to another one of the devices;
a community function module configured to facilitate sharing of the digital asset among the devices; and
a portal configured to interface with the devices for users of the devices to manage respective instant communications accounts.

10. A system according to claim 9, further wherein the community function module is configured to establish a community for the users by maintaining a list of the associated devices participating in the instant communications.

11. A system according to claim 9, further comprising:
an invite module configured to send requests to the devices for inviting the devices to receive the digital asset, wherein the digital asset includes a video stream and is displayed within an instant communications environment.

12. A system according to claim 9, further comprising:
a central repository configured to store the digital asset, wherein the central repository includes content from a third party content provider.

13. A system according to claim 9, wherein one of the devices is configured as editor, the system further comprising:
an editor server configured to support editing of the digital asset by the one device.

14. A system according to claim 9, wherein the portal permits the users to comment on the digital asset via an e-mail service or a blog service.

15. A system according to claim 14, wherein the portal is further configured to permit provisioning and management of the e-mail service or the blog service.

16. A system according to claim 9, wherein a plurality of digital assets are transmitted to one of the devices, the one device being configured to display the digital assets concurrently.

17. A method comprising:
transmitting a digital asset to only one of a plurality of devices configured to support instant communications, wherein the digital asset includes a video stream, and the digital asset is specified by a playlist that is created by one of the devices, the one device transmitting the playlist to another one of the devices;
sharing the digital asset by the one of a plurality of devices with at least one other of the plurality of devices; and
providing a portal for users of the devices to manage respective instant communications accounts.

* * * * *